United States Patent
Moon et al.

(10) Patent No.: US 9,986,557 B2
(45) Date of Patent: May 29, 2018

(54) COMMUNICATION METHOD IN WIRELESS COMMUNICATION SYSTEM ON BASIS OF CARRIER AGGREGATION

(71) Applicant: Electronics and Telecommunications Research Institute, Daejeon (KR)

(72) Inventors: Sung Hyun Moon, Daejeon (KR); Young Jo Ko, Daejeon (KR); Jae Young Ahn, Daejeon (KR); Cheul Soon Kim, Daejeon (KR); Joon Woo Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days. days.

(21) Appl. No.: 14/905,407

(22) PCT Filed: Jul. 15, 2014

(86) PCT No.: PCT/KR2014/006342
§ 371 (c)(1),
(2) Date: Jan. 15, 2016

(87) PCT Pub. No.: WO2015/009004
PCT Pub. Date: Jan. 22, 2015

(65) Prior Publication Data
US 2016/0157226 A1     Jun. 2, 2016

(30) Foreign Application Priority Data

Jul. 16, 2013  (KR) .......................... 10-2013-0083625
Sep. 27, 2013  (KR) .......................... 10-2013-0115678

(Continued)

(51) Int. Cl.
*H04W 72/04*  (2009.01)
*H04B 7/26*   (2006.01)
(Continued)

(52) U.S. Cl.
CPC ...... *H04W 72/0446* (2013.01); *H04B 7/2656* (2013.01); *H04J 1/08* (2013.01);
(Continued)

(58) Field of Classification Search
None
See application file for complete search history.

(56) References Cited

U.S. PATENT DOCUMENTS 9,125,188 B2 * 9/2015 Tamaki ................... H04L 5/001
9,178,682 B2 * 11/2015 Yang ...................... H04L 1/1854
(Continued)

FOREIGN PATENT DOCUMENTS

WO     2012109195 A2    8/2012

OTHER PUBLICATIONS

"Consideration on general FDD/TDD joint operation for LTE," 3GPP TSG-RAN #60, RP-130696, Jun. 11-14, 2013, pp. 1-3.

*Primary Examiner* — Hong Cho
(74) *Attorney, Agent, or Firm* — William Park & Associates Ltd.

(57) ABSTRACT

Disclosed is a communication method in a wireless communication system on the basis of a carrier aggregation. The communication method on the basis of a carrier aggregation comprises the steps of: receiving a PDSCH from a base station via a subframe n of a TDD cell; and transmitting, to the base station, a PUCCH including a response to the PDSCH via a subframe n+4 of an FDD cell. Accordingly, an HARQ process may be performed efficiently.

10 Claims, 21 Drawing Sheets

(30) Foreign Application Priority Data

| | | |
|---|---|---|
| Oct. 31, 2013 | (KR) | 10-2013-0131329 |
| Dec. 4, 2013 | (KR) | 10-2013-0149768 |
| Dec. 5, 2013 | (KR) | 10-2013-0150831 |
| Dec. 24, 2013 | (KR) | 10-2013-0163045 |

(51) Int. Cl.
| | |
|---|---|
| *H04J 1/08* | (2006.01) |
| *H04J 3/16* | (2006.01) |
| *H04L 5/00* | (2006.01) |
| *H04L 5/14* | (2006.01) |
| *H04L 1/18* | (2006.01) |

(52) U.S. Cl.
CPC .......... *H04J 3/1694* (2013.01); *H04L 1/1854* (2013.01); *H04L 1/1861* (2013.01); *H04L 5/001* (2013.01); *H04L 5/0055* (2013.01); *H04L 5/1469* (2013.01); *H04W 72/0406* (2013.01); *H04L 1/1812* (2013.01)

(56) References Cited

U.S. PATENT DOCUMENTS

| | | | |
|---|---|---|---|
| 9,270,399 B2* | 2/2016 | Ahn | H04B 7/2656 |
| 9,276,691 B2* | 3/2016 | Choi | H04J 3/1694 |
| 9,295,046 B2* | 3/2016 | Seo | H04W 72/042 |
| 9,462,587 B2* | 10/2016 | Seo | H04L 5/001 |
| 9,515,782 B2* | 12/2016 | Lin | H04L 1/1607 |
| 9,544,884 B2* | 1/2017 | Lee | H04B 7/2656 |
| 2012/0257552 A1 | 10/2012 | Chen et al. | |
| 2013/0034028 A1 | 2/2013 | Chen et al. | |
| 2013/0077542 A1* | 3/2013 | Yang | H04B 7/15542 370/280 |
| 2013/0121130 A1 | 5/2013 | Ko et al. | |
| 2013/0163543 A1 | 6/2013 | Freda et al. | |
| 2013/0208634 A1 | 8/2013 | Ji et al. | |
| 2014/0119246 A1* | 5/2014 | Yin | H04W 72/12 370/280 |
| 2015/0085711 A1* | 3/2015 | Wang | H04L 5/14 370/280 |

* cited by examiner

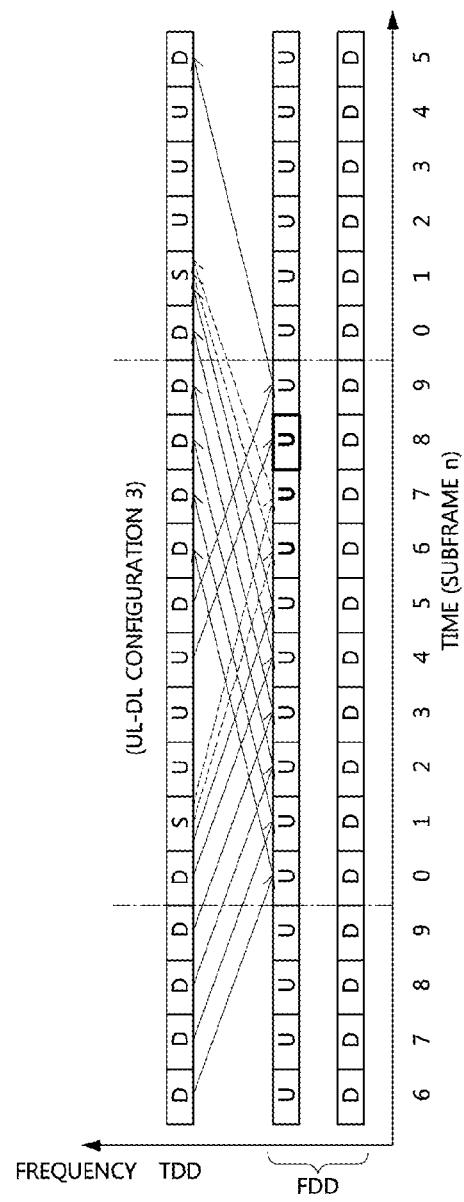

COMMUNICATION METHOD IN WIRELESS COMMUNICATION SYSTEM ON BASIS OF CARRIER AGGREGATION

BACKGROUND

1. Field

Example embodiments of the present invention relate to a communication method in a wireless communication system, and more specifically to a communication method in a wireless communication system in which at least one time division duplexing (TDD) carrier and at least one frequency division multiplexing (FDD) carrier are aggregated.

2. Description of Related Art

In a cellular communication environment, a general method for exchanging data between terminals is a communication method via a base station. That is, if a first terminal has data to be transmitted to a second terminal, the first terminal transmits the data to a first base station to which it belongs. Then, the first base station transmits the data received from the first terminal to a second base station to which the second terminal belongs through a core network. At last, the second base station transmits the data received from the first base station to the second terminal. Here, the first base station and the second base station may be same, or may be different.

A carrier aggregation (CA) technique may be introduced into such the cellular communication system. The CA technique means a technique which configures a single wideband by aggregating a plurality of component carriers (CC). In the conventional CA based wireless communication system, only component carriers based on a same duplexing mode are aggregated. That is, the conventional system is configured by aggregating only TDD-mode component carriers or by aggregating only FDD-mode component carriers.

On the other hand, hybrid automatic repeat request (HARQ) timing scheme should be redesigned in the CA between a TDD cell and a FDD cell because a frame structure of the TDD cell is different from a frame structure of the FDD cell.

SUMMARY

Accordingly, example embodiments of the present invention are provided to substantially obviate one or more problems due to limitations and disadvantages of the related art.

Example embodiments of the present invention provide methods for efficiently performing a HARQ process in a wireless communication system in which at least one TDD component carrier and at least one FDD component carrier are aggregated.

Example embodiments of the present invention also provide apparatuses for efficiently performing a HARQ process in a wireless communication system in which at least one TDD component carrier and at least one FDD component carrier are aggregated.

In some example embodiments, a communication method based on carrier aggregation, performed in a terminal, the method comprises receiving a physical downlink shared channel (PDSCH) from a base station through a n-th subframe of a time division duplexing (TDD) cell, wherein n is a natural number; and transmitting a physical uplink control channel (PUCCH) including a response to the PDSCH to the base station through a (n+4)-th subframe of a frequency division duplexing (FDD) cell.

Here, the n-th subframe of the TDD cell is a downlink subframe or a special subframe.

Here, the TDD cell is a secondary cell.

Here, the FDD cell is a primary cell.

In some example embodiments, a communication method based on carrier aggregation, performed in a terminal, the method comprises receiving a physical downlink shared channel (PDSCH) from a base station through a n-th subframe of a frequency division duplexing (FDD) cell, wherein n is a natural number; and when a (n+4)-th subframe of a time division duplexing (TDD) cell is an uplink subframe, transmitting a physical uplink control channel (PUCCH) including a response to the PDSCH to the base station through the (n+4)-th subframe of a time division duplexing (TDD) cell.

Here, the method further comprises when the (n+4)-th subframe of the TDD cell is not an uplink subframe, transmitting the PUCCH including the response to the PDSCH to the base station through an uplink subframe which is the closest to the (n+4)-th subframe after the (n+4)-th subframe.

Here, the FDD cell is a secondary cell.

Here, the TDD cell is a primary cell.

In some example embodiments, a communication method based on carrier aggregation, performed in a terminal, the method comprises receiving a physical downlink shared channel (PDSCH) from a base station through a n-th subframe of a frequency division duplexing (FDD) cell; and when a first subframe, which is an uplink subframe according to a UL-DL (Uplink/Downlink) configuration of the TDD cell, corresponds to the n-th subframe, transmitting a physical uplink control channel (PUCCH) including a response to the PDSCH to the base station through the first subframe of the TDD cell, wherein n is a natural number.

Here, the method further comprises when the first subframe does not correspond to the n-th subframe, transmitting the PUCCH including the response to the PDSCH to the base station through an uplink subframe conforming to a predetermined downlink-uplink subframe relation among uplink subframes of the TDD cell.

Here, the uplink subframe conforming to the predetermined downlink-uplink subframe relation is an uplink subframe which is the closest to the (n+4)-th subframe after the (n+4)-th subframe.

Here, the uplink subframe conforming to the predetermined downlink-uplink subframe relation is a (n+5)-th uplink subframe of the TDD cell.

Here, the uplink subframe conforming to the predetermined downlink-uplink subframe relation is a first uplink subframe included in a next radio frame of the TDD cell.

Here, the FDD cell is a secondary cell.

Here, the TDD cell is a primary cell.

In some example embodiments, a communication method based on carrier aggregation, performed in a terminal, the method comprises receiving a physical downlink shared channel (PDSCH) including an uplink grant from a base station through a n-th subframe of a frequency division duplexing (FDD) cell; transmitting a physical uplink shared channel (PUSCH) based on the uplink grant to the base station through a (n+k)-th subframe of a time division duplexing (TDD) cell; and receiving a physical hybrid-ARQ indicator channel (PHICH) including a response to the PUSCH from the base station through a (n+10)-th subframe of the FDD cell, wherein k and 1 are natural numbers.

Here, the k is 4.

Here, the k is 5.

Here, the k is 6.

Here, the TDD cell is cross-carrier-scheduled by the FDD cell.

According to the present invention, HARQ processes can be performed efficiently in a wireless communication system in which at least one TDD component carrier and at least one FDD component carrier are aggregated.

BRIEF DESCRIPTION OF DRAWINGS

Example embodiments of the present invention will become more apparent by describing in detail example embodiments of the present invention with reference to the accompanying drawings, in which:

FIG. 22 is a conceptual diagram illustrating subframe relations of PDCCH/EPDCCH, PHICH, and PUSCH in a FDD cell (that is, a case when a UL-DL configuration of the TDD cell is 3 in the method 3-12) when the FDD cell is cross-carrier-scheduled by a TDD cell.

DETAILED DESCRIPTION OF EXEMPLARY EMBODIMENTS

Figure 1:
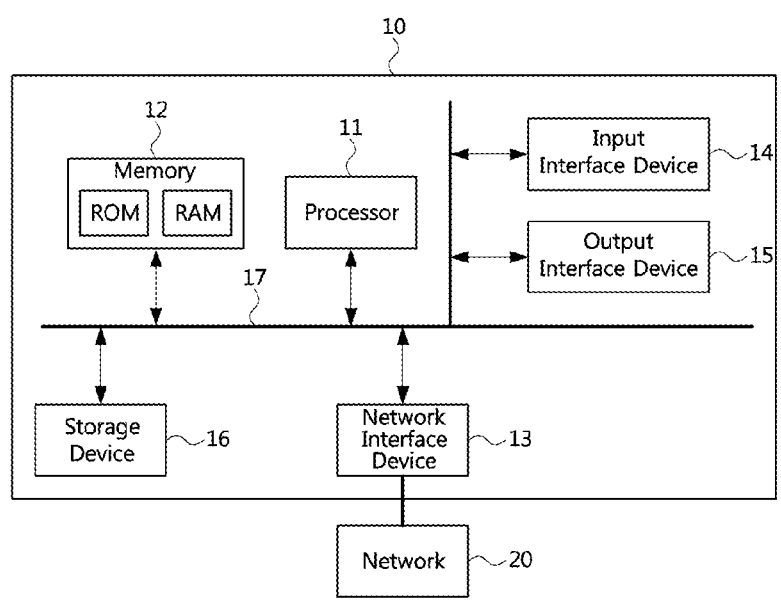
FIG. 1 is a block diagram illustrating an example embodiment of a station performing methods according to the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. To aid in understanding the present invention, like numbers refer to like elements throughout the description of the drawings, and the description of the same element will not be reiterated.

In the entire specification, a network may include a wireless internet such a wireless fidelity (WIFI), a portable internet such as a wireless broadband internet (WiBro) or a world interoperability for microwave access (WiMax), a 2G mobile communication network such as a global system for mobile communication (GSM) or a code division multiple access (CDMA), a 3G mobile communication network such as a wideband code division multiple access (WCDMA) or CDMA2000, a 3.5G mobile communication network such as a high speed downlink packet access (HSDPA) or a high speed uplink packet access (HSUPA), a 4G mobile communication network such as a long term evolution (LTE) or a LTE-Advanced, and a 5G mobile communication network.

Also, in the entire specification, the 'terminal may' refer to user equipment (UE), a mobile station (MS), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terms.

Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and reproduction appliances having a wireless communication function, Internet appliances enabling wireless Internet connection and browsing, and a portable unit or terminals with integrated combinations of such functions, but are not limited thereto.

Also, the "base station" used in this specification means a fixed point that communicates with terminals, and may be referred to as another word, such as an access point, a radio access station, Node-B, eNode-B, a base transceiver system (BTS), a mobile multihop relay-base station (MMR-BS), etc. The "base station" may include entire or some features of the access point, the radio access station, Node-B, eNode-B, the BTS, the MMR-BS, etc.

FIG. 1 is a block diagram illustrating an example embodiment of a station performing methods according to the present invention.

Referring to FIG. 1, a station 10 may comprise at least one processor 11, a memory 12, and a network interface device 13 performing communications with a network 20. In addition, the station 10 may further comprise an input interface device 14, an output interface device 15, and a storage device 16, etc. Each components constituting the station 10 may be connected through a bus 17, and communicate with each other.

The processor 11 may execute program codes stored in the memory 12 and/or the storage device 16. The processor 11 may be a central processing unit (CPU), a graphics processing unit (GPU), or a dedicated processor on which the methods according to the present invention are performed. The memory 12 and the storage device 16 may be configured with at least one volatile memory device and/or at least one non-volatile memory device. For example, the memory 12 may be configured with a read-only memory (ROM) and/or a random access memory (RAM).

Hereinafter, a frame structure and a basic operation scheme of an LTE-TDD mode will be explained.

As shown in a below table 1, in the LTE-TDD mode, totally 7 UL-DL (Uplink-Downlink) configurations are available. The frame structure of the TDD component carrier may be configured to one of 7 UL-DL configurations. Here, the D may mean a downlink subframe, the U may mean an uplink subframe, and the S may mean a special subframe. The special subframe may be located between the DL subframe and the UL subframe, and include a downlink pilot time slot (DwPTS), a guard period (GP), and an uplink pilot time slot (UpPTS). The DwPTS may be used for cell search, synchronization, or channel estimation. The GP may mean a period used for eliminating interference generated in the uplink of the base station by delay difference between multi paths of terminals. The transmission of physical random access channel (PRACH) or sounding reference signal (SRS) is available in the UpPTS. The PDSCH may be transmitted in the DwPTS.

TABLE 1

| UL-DL Configuration | DL-UL Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the specification, the term 'UL-DL subframe relations' mean relations between subframes through which a physical downlink control channel (PDCCH) including an uplink grant or indicating downlink semi-persistent scheduling (SPS) release, a physical hybrid-ARQ indicator channel (PHICH) including a hybrid automatic repeat request ACK (HARQ-ACK), a physical uplink shared channel (PUSCH), and a physical downlink shared channel (PDSCH) are transmitted. When a HARQ-ACK is transmitted through a n-th uplink subframe, if a downlink subframe corresponding to the HARQ-ACK is a (n−k)-th downlink subframe, k may be an element of a set comprising at least one value. A below table 2 represents an example of ($\{k_0, k_1, \ldots, k_{M-1}\}$), which is a downlink assignment index set for the LTE-TDD mode.

TABLE 2

| UL-DL Config-uration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The temporal relations between UL subframes and DL subframes for each UL-DL configuration of the LTE-TDD mode may be obtained from the above tables 1 and 2.

Figure 2:
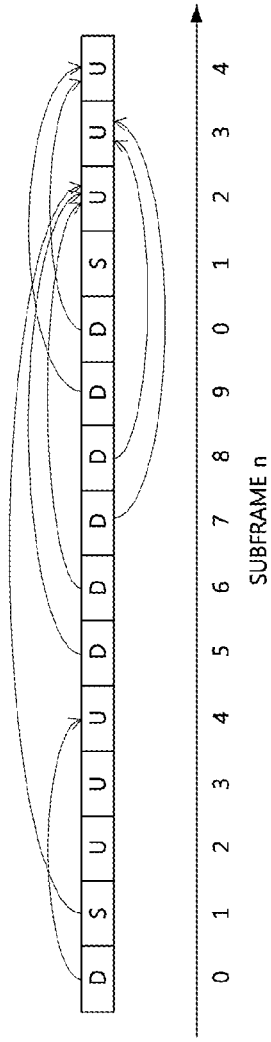
FIG. 2 is a conceptual diagram illustrating downlink transmission UL-DL subframe relations for a UL-DL configuration 3 of the LTE-TDD mode.

FIG. 2 is a conceptual diagram illustrating downlink transmission UL-DL subframe relations for a UL-DL configuration 3 of the LTE-TDD mode.

Referring to FIG. 2, HARQ-ACKs corresponding to PDSCH or PDCCH instructing a downlink SPS release which are transmitted through subframes 1, 5, and 6 of a n-th radio frame can be transmitted through a subframe 2 of a (n+1)-th radio frame.

Hereinafter, a basic operating method of the CA scheme will be explained.

In the conventional LTE single CA system, a single component carrier is only allocated to the uplink and the downlink of the terminal. However, in the CA system introduced in release-10 and release-11, a plurality of component carriers may be allocated to the uplink and the downlink of the terminal. The number of UL component carrier may be different from the number of DL component carrier. The linkage between the UL component carrier and the DL component carrier may be indicated by ul-Carrier-Freq parameter included in the system information block type 2 (SIB2).

The component carrier which is allocated to the terminal may be classify to the primary cell or the secondary cell. The primary cell may mean a cell performing initial radio resource control (RRC) connection establishment procedure between the terminal and the base station, or having new RRC connection by a serving cell, which indicates the primary cell as target cell, in a handover procedure. The secondary cell may mean a cell which is additionally configured for providing additional radio resource to the terminal after establishment of RRC connection by the primary cell. In the CA system, the base station may manage the secondary cell per the terminal based on a measurement report of the terminal, uplink or downlink traffic status, and etc. The secondary cell may be added or canceled by RRC signaling. The secondary cell completing RRC configuration may operate in activation or deactivation mode by MAC control element (CE) signaling.

The LTE CA system may support the cross-carrier-scheduling. In the cross-carrier-scheduling, the control information for resource allocation of the PDSCH and the physical uplink shared channel (PUSCH) of arbitrary serving cell may be transmitted through the physical downlink control channel (PDCCH) of a cell instead of the arbitrary serving cell. The cross-carrier-scheduling may be set based on upper layer signaling (that is, cif-Presence) about each serving cell of the terminal. When the cross-carrier-scheduling is applied to arbitrary serving cell, an indicator indicating a cell through which the PDSCH or PUSCH (or PDCCH order for indicating random access based on non-contention) indicated by downlink control information (DCI) transmitted the PDCCH of the arbitrary serving cell is necessary. The indicator is called to a carrier indicator field (CIF). The CIF may be included in DCI format 1/1A/1B/1D/2/2A/2B/2C/2D and format 0/4. The cross-carrier-scheduling is not exceptionally applied to the primary cell. That is, the resource allocation information of the primary cell is always transmitted through the PDCCH of the primary cell.

Method for Transmitting Downlink HARQ

Hereafter, a method for transmitting downlink HARQ (that is, a method for a terminal to transmit HARQ-ACK indicating whether or not PDSCH received from a base station is retransmitted) in the CA system including the FDD cell and the TDD cell will be explained. When a plurality of cells (or, carriers) are configured for a terminal, a cell among the plurality of cells may be configured as a primary cell, and the rest of the cells may be configured as secondary cells. A terminal having a plurality of cells may always transmit a HARQ-ACK using the PUCCH. Therefore, when the FDD cell is a primary cell and the TDD cell is a secondary cell or when the TDD cell is a primary cell and the FDD cell is secondary cell, a transmission timing of HARQ-ACK using PUCCH of the secondary cell should be newly defined. Here, the transmission timing of HARQ-ACK of the primary cell may be identical to conventional transmission timing of HARQ-ACK of the corresponding cell.

A Case where a FDD Cell is a Primary Cell and a TDD Cell is a Secondary Cell

The transmission timing relations of PDSCH HARQ of the FDD primary cell may be identical to the conventional transmission timing relations of FDD. That is, a HARQ-ACK corresponding to a PDSCH or a PDCCH instructing downlink SPS release which is scheduled on a n-th subframe of the FDD primary cell can be transmitted at a (n+4)-th uplink subframe of the FDD primary cell.

Then, a method for determining downlink transmission UL-DL subframe relation of the TDD secondary cell when the TDD secondary cell is cross-carrier-scheduled by the FDD primary cell will be explained. When the TDD secondary cell is cross-carrier-scheduled by FDD secondary cell, below methods may be identically applied.

Also, even when the cross-carrier scheduling is used, since a downlink subframe of the FDD primary cell or other FDD secondary cell corresponding to all 'D' and 'S' of the TDD secondary cell always exists, all 'D' and 'S' of the TDD secondary cell can be used for PDSCH transmission.

(Method 1-1) The transmission timing relations of HARQ-ACK of the TDD secondary cell may be identical to the conventional transmission timing relations of TDD about the UL-DL configuration of the TDD secondary cell. That is, the method 1-1 means that a UL-DL subframe relation defined by the UL-DL configuration of the TDD secondary cell is used as it is. In the method 1-1, an uplink subframe of the FDD primary cell may correspond to at least one downlink subframe of the TDD secondary cell. In all the configurations of a TDD secondary cell excluding the configurations 0 and 6, a single uplink subframe of the FDD primary cell may correspond to a plurality of downlink subframes of the TDD secondary cell. Here, since HARQ- ACK of the FDD primary cell can be added, the number of bits for HARQ-ACK transmitted through a specific uplink subframe of the FDD primary cell can increase further. Accordingly, specific uplink subframes of the FDD primary cell cannot be fully utilized.

Figure 3:
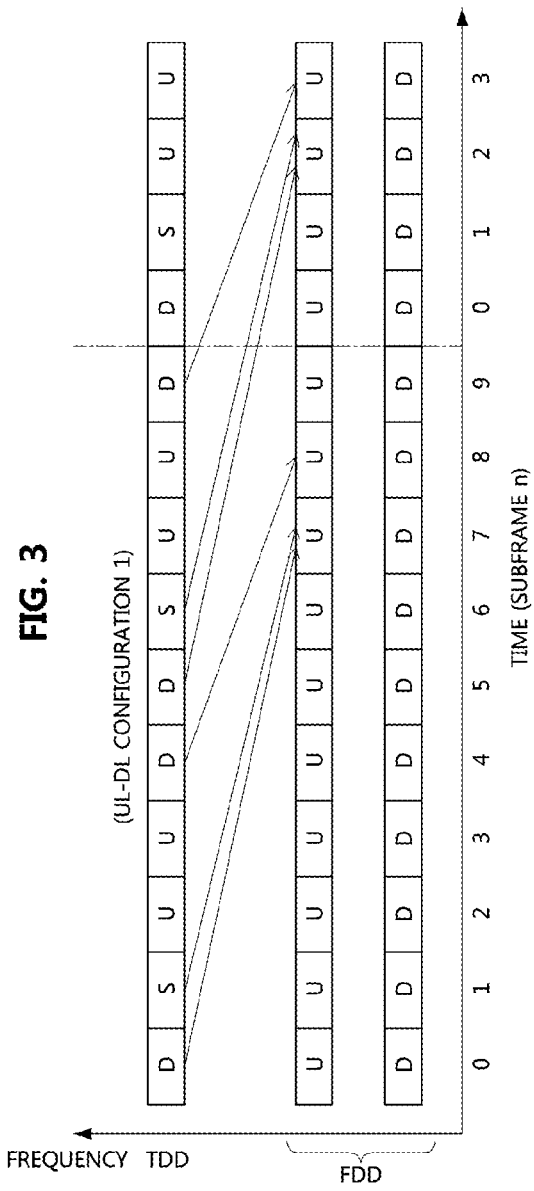
FIG. 3 is a conceptual diagrams illustrating downlink transmission UL-DL subframe relations of a TDD secondary cell (that is, a case when a UL-DL configuration of the TDD cell is 1 in the method 1-1) when a FDD cell is a primary cell.

FIG. 3 is a conceptual diagram illustrating downlink transmission UL-DL subframe relations of a TDD secondary cell when a FDD cell is a primary cell.

Referring to FIG. 3, the transmission timing relations of HARQ-ACK of the TDD secondary cell may be identical to the conventional transmission timing relations of TDD in UL-DL configuration 1 of the TDD secondary cell (that is, method 1-1). Since a HARQ-ACK corresponding to 'D' and 'S' of the TDD cell is mapped only to uplink subframes 2, 3, 7, and 8 of the FDD cell, FDD uplink subframes cannot be fully utilized.

(Method 1-2) The transmission timing relations of HARQ-ACK of the TDD secondary cell may be identical to the transmission timing relations of the FDD. That is, a HARQ-ACK corresponding to a PDSCH or a PDCCH instructing downlink SPS release which is scheduled on a n-th subframe of the TDD cell can be transmitted at a (n+4)-th uplink subframe. According to the method 1-2, it becomes similar to a case in which a HARQ-ACK is transmitted in a CA system comprising two FDD cells. The method 1-2 can distribute HARQ-ACK transmissions over more uplink subframes as compared to the method 1-1. Also, since a cross-carrier scheduling is used, allocation of PUCCH resources for transmitting a PUCCH format 1b using channel selection may be performed identically to that of a conventional CA system comprising two FDD cells, and a HARQ-ACK can be transmitted through the allocated PUCCH resources. Also, when a PUCCH format 3 is used, a HARQ-ACK can be transmitted in a manner identical to a conventional HARQ-ACK transmission manner using PUCCH format 3 of a conventional CA system comprising two FDD cells.

Figure 4:
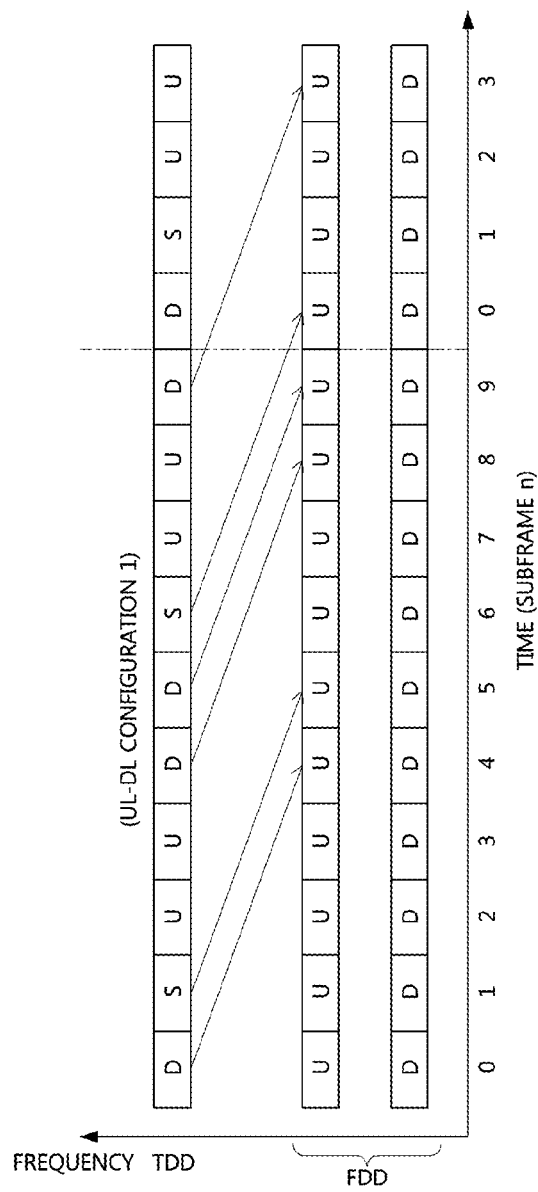
FIG. 4 is conceptual diagrams illustrating downlink transmission UL-DL subframe relations of a TDD secondary cell (that is, a case when a UL-DL configuration of the TDD cell is 1 in the method 1-2) when a FDD cell is a primary cell.

FIG. 4 is a conceptual diagram illustrating downlink transmission UL-DL subframe relations of a TDD secondary cell when a FDD cell is a primary cell. That is, FIG. 4 illustrates a case in which a UL-DL configuration is 1 in the method 1-2.

Referring to FIG. 4, illustrated are UL-DL subframe relations when the FDD cell is a primary cell, and the UL-DL configuration of the TDD cell is 1, and the TDD secondary cell uses UL-DL subframe relations of the FDD cell (that is, according to the method 1-2). That is, HARQ-ACKs corresponding to 'D' and 'S' of a TDD cell can be transmitted as distributed on uplink subframes 4, 5, 8, 9, 0, and 3. As compared to the method 1-1, the method 1-2 can make relatively more uplink subframes of the FDD cell be used for HARQ-ACK transmission.

Also, according to the method 1-2, when a n-th subframe of the TDD cell is changed from 'U' to 'D', a HARQ-ACK corresponding to the n-th subframe can be transmitted through a (n+4)-th uplink subframe. In other words, when a HARQ-ACK is transmitted by using PUCCH, the HARQ-ACK can be transmitted through a (n+4)-th uplink subframe of the FDD cell.

Hereinafter, when a CIF is not configured for the TDD secondary cell, and so a cross-carrier scheduling cannot be used, a method for determining UL-DL subframe relations of the TDD secondary cell will be explained.

Since a self-carrier scheduling cannot be used, a self-scheduling may be performed by the TDD secondary cell. However, because the FDD cell is a primary cell, subframes of the TDD secondary cell through which PDSCH can be transmitted are configured identically to the above-described case where a cross-carrier scheduling is used. Accordingly, the following two methods can be considered.

(Method 1-3) The transmission timing relations of HARQ-ACK of the TDD secondary cell may be identical to the conventional transmission timing relations of TDD about the UL-DL configuration of the TDD secondary cell. That is, the HARQ-ACK in response to the PDCCH indicating downlink SPS release or the PDSCH transmitted through downlink n-th subframe of the TDD cell may be transmitted through corresponding uplink subframe of the FDD cell according to UL-DL subframe relations of the table 2 about the UL-DL configuration of the TDD cell.

(Method 1-4) The transmission timing relations of HARQ-ACK of the TDD secondary cell may be identical to the transmission timing relations of the FDD. That is, a HARQ-ACK corresponding to a PDSCH or a PDCCH instructing downlink SPS release which is transmitted through a n-th subframe of the TDD cell can be transmitted at a (n+4)-th uplink subframe of the FDD cell.

As above-described cross-carrier-scheduling, the method 1-3 may make more HARQ-ACKs can be transmitted using a single uplink subframe of the FDD primary cell with compared to the method 1-4.

A Case where a TDD Cell is a Primary Cell and a FDD Cell is a Secondary Cell

Hereinafter, an operation of a terminal when a TDD cell is a primary cell and a FDD cell is a secondary cell will be explained. The transmission timing relations of PDSCH HARQ of the TDD primary cell may be identical to the conventional transmission timing relations of TDD. That is, the HARQ-ACK in response to the PDCCH indicating downlink SPS release or the PDSCH scheduled in downlink n-th subframe of the TDD primary cell may be transmitted through corresponding uplink subframe of the TDD primary cell according to UL-DL subframe relations of the table 2 about the UL-DL configuration of the TDD primary cell.

Next, a method for determining downlink transmission UL-DL subframe allocations for the FDD secondary cell.

First, when a CIF is not configured for the FDD secondary cell, and so a cross-carrier scheduling cannot be used, a method for determining UL-DL subframe relations of the FDD secondary cell will be explained.

(Method 2-1) The transmission timing relations of HARQ-ACK of the FDD secondary cell may be identical to the UL-DL subframe relations used in the conventional single FDD cell. The conventional UL-DL subframe relations used in a single FDD means that a HARQ ACK corresponding to a n-th downlink subframe is transmitted through a (n+4)-th uplink subframe. However, if the method 2-1 is used, although a HARQ-ACK corresponding to a n-th downlink subframe of the FDD cell should be transmitted through a (n+4)-th subframe of the TDD primary cell, the (n+4)-th subframe of the TDD primary cell may not be an uplink frame. That is, if the (n+4)-th subframe of the TDD primary cell is a downlink subframe or a special subframe, the HARQ-ACK cannot be transmitted through the (n+4)-th subframe. In this case, if the HARQ-ACK cannot be transmitted, a PDSCH or a PDCCH instructing downlink SPS release corresponding to the HARQ-ACK may not be transmitted. Therefore, the transmission may not be performed in corresponding downlink subframe. That is, downlink subframes of the FDD secondary cell which can be scheduled based on UL-DL configuration of the TDD primary cell may be restricted to some subframes in a radio frame.

(Method 2-2) The transmission timing relations of HARQ-ACK of the FDD secondary cell may be identical to the conventional transmission timing relations of the TDD about the UL-DL configuration of the TDD primary cell. That is, this means UL-DL subframe relations of the TDD cell are applied to the FDD cell. However, a UL-DL subframe relation between a downlink subframe of the FDD secondary cell and an uplink subframe of the TDD primary cell may not exist also according to the method 2-2. That is, since a FDD downlink subframe which does not have a corresponding TDD uplink subframe cannot be used, subframes of the FDD cell which can be downlink-scheduled based on the given TDD UL-DL configuration may be restricted to some subframes in a radio frame.

Next, when a CIF is configured for the FDD secondary cell, and a cross-carrier scheduling is performed in the TDD primary cell, a method for determining UL-DL subframe relations of the FDD secondary cell will be explained. Even when the FDD secondary cell is cross-carrier-scheduled by the TDD secondary cell whose UL-DL configuration is identical to the UL-DL configuration of the TDD primary cell, below methods may be applied.

(Method 2-3) The transmission timing relations of HARQ-ACK of the FDD secondary cell may be identical to the convention transmission timing relations of the TDD about the UL-DL configuration of the TDD primary cell. That is, this means UL-DL subframe relations of the TDD cell are applied to the FDD cell. However, a UL-DL relation between a downlink subframe of the FDD secondary cell and an uplink subframe of the TDD primary cell may not exist also according to the method 2-3. Also, a cross-carrier scheduling according to a current LTE specification is possible only for a subframe in which both the TDD cell and the FDD cell are configured as downlink. Thus, a PDSCH scheduling may be possible only for some of downlink subframes of the FDD secondary cell according to the UL-DL configuration of the TDD primary cell, and not for the rest of downlink subframes of the FDD cell.

Figure 5:
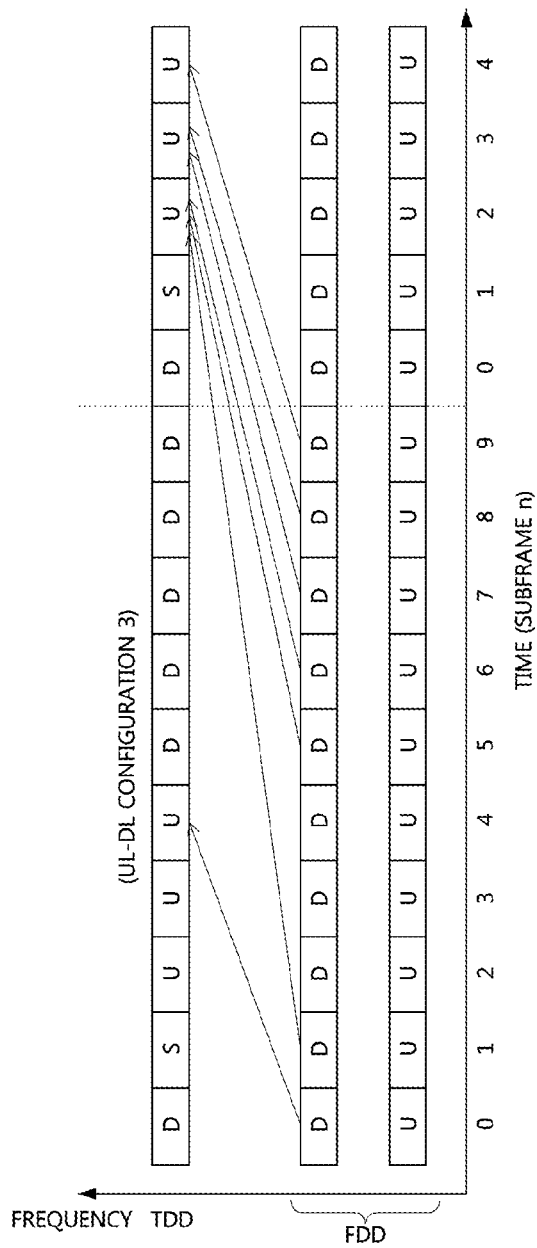
FIG. 5 is conceptual diagrams illustrating downlink transmission UL-DL subframe relations of a FDD secondary cell (that is, a case when a UL-DL configuration of the TDD cell is 3 in the method 2-3) when a TDD cell is a primary cell.

FIG. 5 is a conceptual diagram illustrating downlink transmission UL-DL subframe relations of a FDD secondary cell when a TDD cell is a primary cell. That is, FIG. 5 illustrates a case in which a UL-DL configuration is 3 in the method 2-3.

Referring to FIG. 5, illustrated are UL-DL subframe relations when the TDD cell is a primary cell, and the UL-DL configuration of the TDD cell is 3, and the UL-DL configuration of the TDD primary cell is selected as a DL-reference UL-DL configuration of the FDD secondary cell. Some downlink subframes (for example, subframes 2, 3, and 4) of the FDD secondary cell may not be scheduled for a terminal.

The following description includes several options to resolve the above-mentioned problems of the methods 2-1, 2-2, and 2-3.

Using a multi-subframe scheduling

Configuring DL-reference UL-DL configurations of the FDD secondary cell terminal-specifically, and making different DL-reference UL-DL configuration for each terminal possible Expanding the conventional UL-DL configurations of the TDD cell so as to use all uplink subframes of the TDD primary cell and all downlink subframes of the FDD cell.

Hereinafter, the above-mentioned method for expanding the conventional UL-DL subframe relations of the TDD cell so as to use all uplink subframes of the TDD primary cell and all downlink subframes of the FDD cell will be explained.

First, a method for determining UL-DL subframe relations of the FDD secondary cell when the FDD secondary cell is not cross-carrier-scheduled by the TDD primary cell will be explained.

(Method 2-4) A downlink subframe of the FDD cell, which can maintain HARQ-ACK timing, may maintain HARQ-ACK timing of the FDD. That is, if a (n+4)-th subframe of the TDD cell is an uplink subframe, a PDSCH can be transmitted through a n-th downlink subframe of the FDD cell. On the contrary, if the (n+4)-th subframe of the TDD cell is not an uplink subframe, a HARQ-ACK corresponding to the n-th subframe cannot be transmitted the (n+4)-th subframe of the TDD cell. Thus, at least one new UL-DL subframe relation for some of the downlink frames of the FDD cell may be defined additionally.

Figure 6:
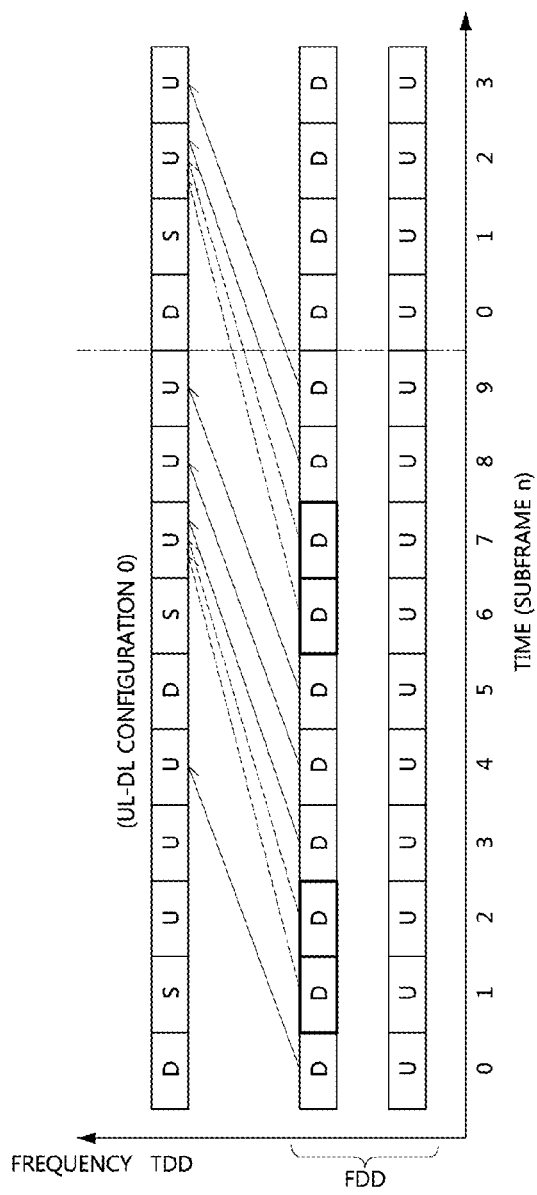
FIG. 6 is conceptual diagrams illustrating downlink transmission UL-DL subframe relations of a FDD secondary cell (that is, a case when a UL-DL configuration of the TDD primary cell is 0 in the method 2-4) when a TDD cell is a primary cell.

FIG. 6 is a conceptual diagram illustrating downlink transmission UL-DL subframe relations of a FDD secondary cell when a TDD cell is a primary cell. That is, FIG. 6 illustrates a case in which a UL-DL configuration of the TDD primary cell is 0 in the method 2-4.

Referring to FIG. 6, when a n-th subframe is a downlink subframe of the FDD cell (that is, downlink subframes 1, 2, 6, and 7 of the FDD cell), and a (n+4)-th subframe is not an uplink subframe of the TDD cell, a HARQ-ACK corresponding to the n-th subframe can be transmitted through an uplink subframe of the TDD cell which is the closest to the (n+4)-th subframe after the (n+4)-th subframe.

A below table 3 represents an example of K ($\{k_0, k_1, \ldots, k_{M-1}\}$), which is downlink assignment index set for the FDD secondary cell. That is, the table 3 represents an example of HARQ-ACK timing of the FDD secondary cell according to the UL-DL configuration of the TDD primary cell which is obtained from the method 2-4. Here, the reference may be applied such that a gap between a transmission time of a PDSCH and a transmission time of a HARQ-ACK corresponding to the PDSCH is as minimal as possible.

TABLE 3

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4, 5, 6 | 4 | 4 | — | — | 4, 5, 6 | 4 | 4 |
| 1 | — | — | 4, 5, 6, 7 | 4 | — | — | — | 4, 5, 6, 7 | 4 | — |
| 2 | — | — | 4, 5, 6, 7, 8 | — | — | — | — | 4, 5, 6, 7, 8 | — | — |
| 3 | — | — | 4, 5, 6, 7, 8, 9, 10, 11 | 4 | 4 | — | — | — | — | — |
| 4 | — | — | 4, 5, 6, 7, 8, 9, 10, 11, 12 | 4 | — | — | — | — | — | — |

TABLE 3-continued

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 5 | — | — | 4, 5, 6, 7, 8, 9, 10, 11, 12, 13 | — | — | — | — | — | — | — |
| 6 | — | — | 4, 5, 6, 7 | 4 | 4 | — | — | 4, 5, 6 | 4 | — |

(Method 2-5) A new DL-reference UL-DL configuration including a UL-DL configuration of the TDD primary cell may be used for the FDD secondary cell. This means that UL-DL subframe relations of the UL-DL configuration of the TDD primary cell are applied to the transmission timing relations of HARQ of the FDD secondary cell, and new UL-DL subframe relations are defined for downlink subframes of the FDD cell which are not specified by the UL-DL subframe relations of the TDD primary cell.

Figure 7:
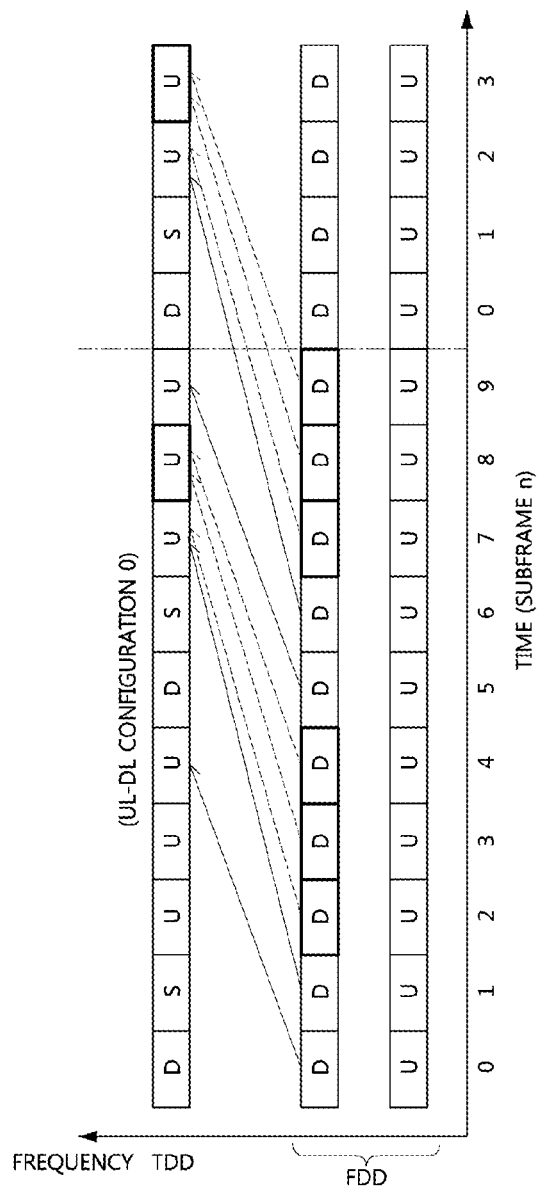
FIG. 7 is conceptual diagrams illustrating downlink transmission UL-DL subframe relations of a FDD secondary cell (that is, a case when a UL-DL configuration of the TDD cell is 0 in the method 2-5) when a TDD cell is a primary cell.
Figure 8:
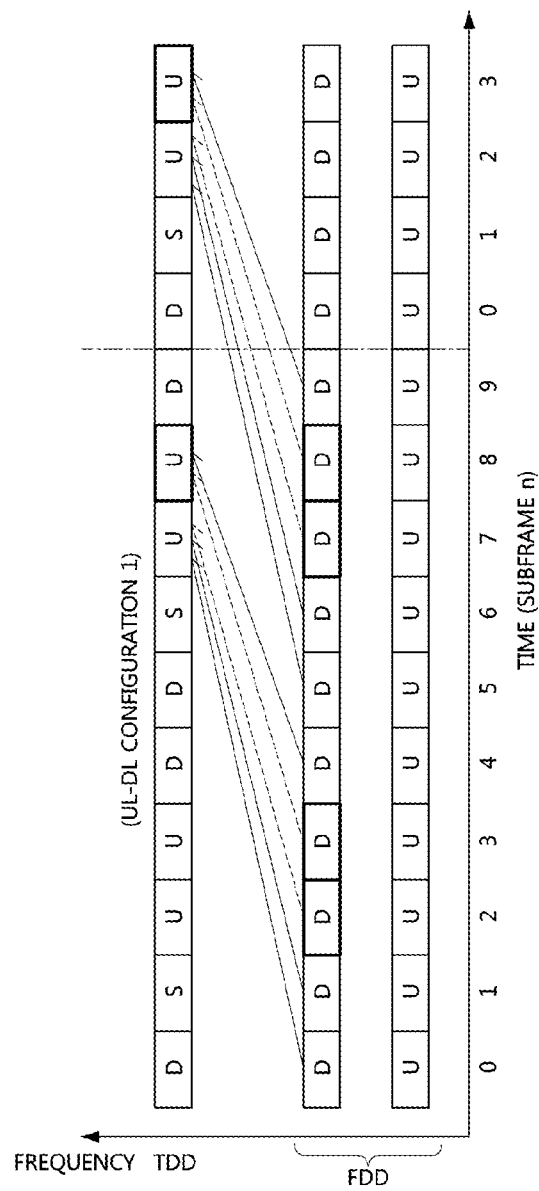
FIG. 8 is conceptual diagrams illustrating downlink transmission UL-DL subframe relations of a FDD secondary cell (that is, a case when a UL-DL configuration of the TDD cell is 1 in the method 2-5) when a TDD cell is a primary cell.
Figure 9:
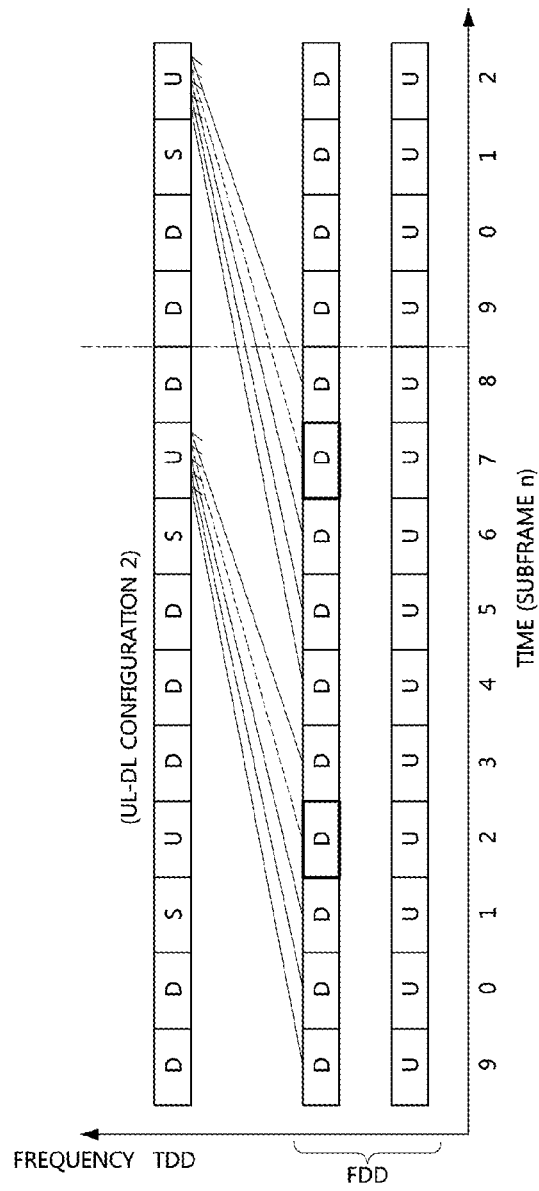
FIG. 9 is conceptual diagrams illustrating downlink transmission UL-DL subframe relations of a FDD secondary cell (that is, a case when a UL-DL configuration of the TDD cell is 2 in the method 2-5) when a TDD cell is a primary cell.
Figure 10:
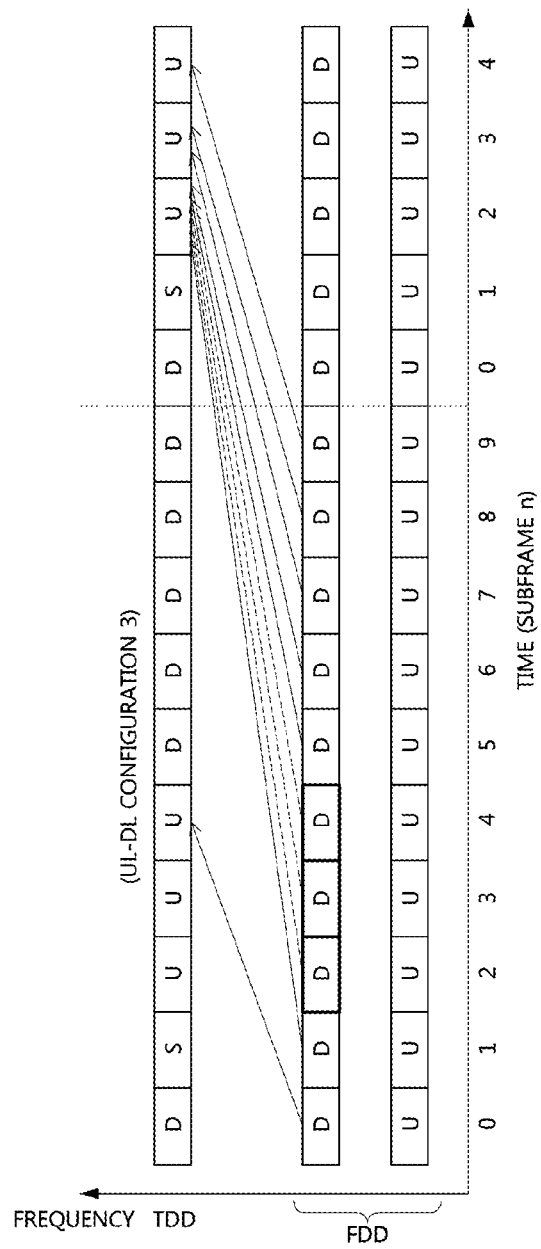
FIG. 10 is conceptual diagrams illustrating downlink transmission UL-DL subframe relations of a FDD secondary cell (that is, a case when a UL-DL configuration of the TDD cell is 3 in the method 2-5) when a TDD cell is a primary cell.
Figure 11:
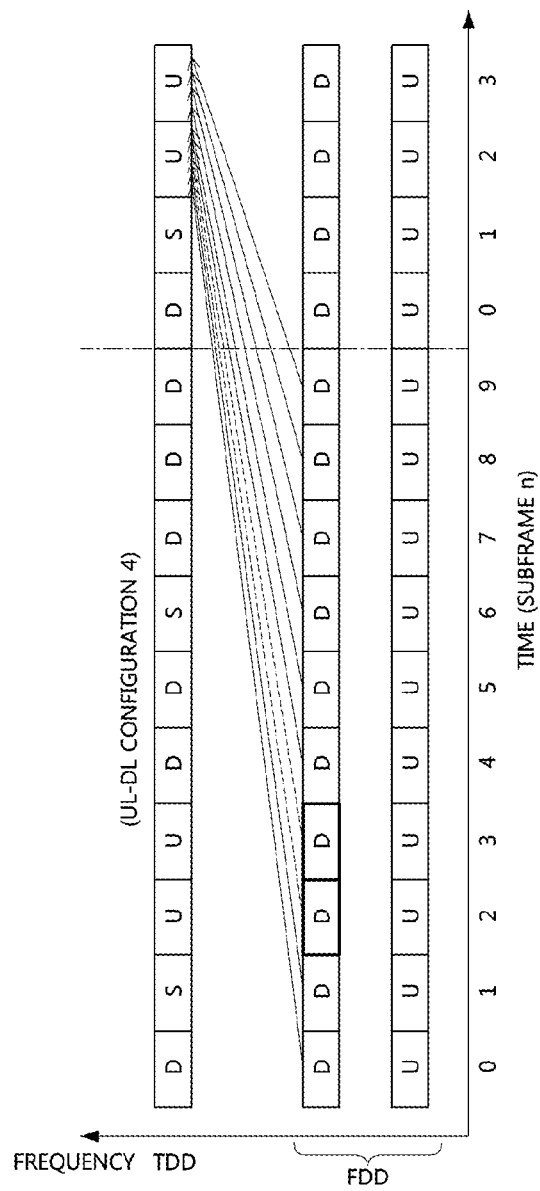
FIG. 11 is conceptual diagrams illustrating downlink transmission UL-DL subframe relations of a FDD secondary cell (that is, a case when a UL-DL configuration of the TDD cell is 4 in the method 2-5) when a TDD cell is a primary cell.
Figure 12:
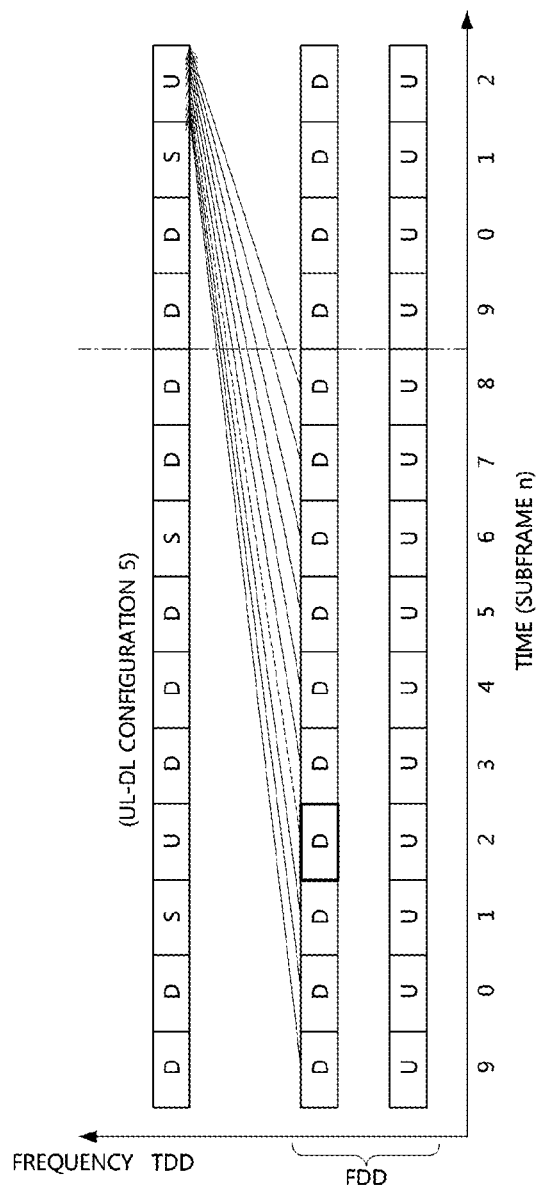
FIG. 12 is conceptual diagrams illustrating downlink transmission UL-DL subframe relations of a FDD secondary cell (that is, a case when a UL-DL configuration of the TDD cell is 5 in the method 2-5) when a TDD cell is a primary cell.
Figure 13:
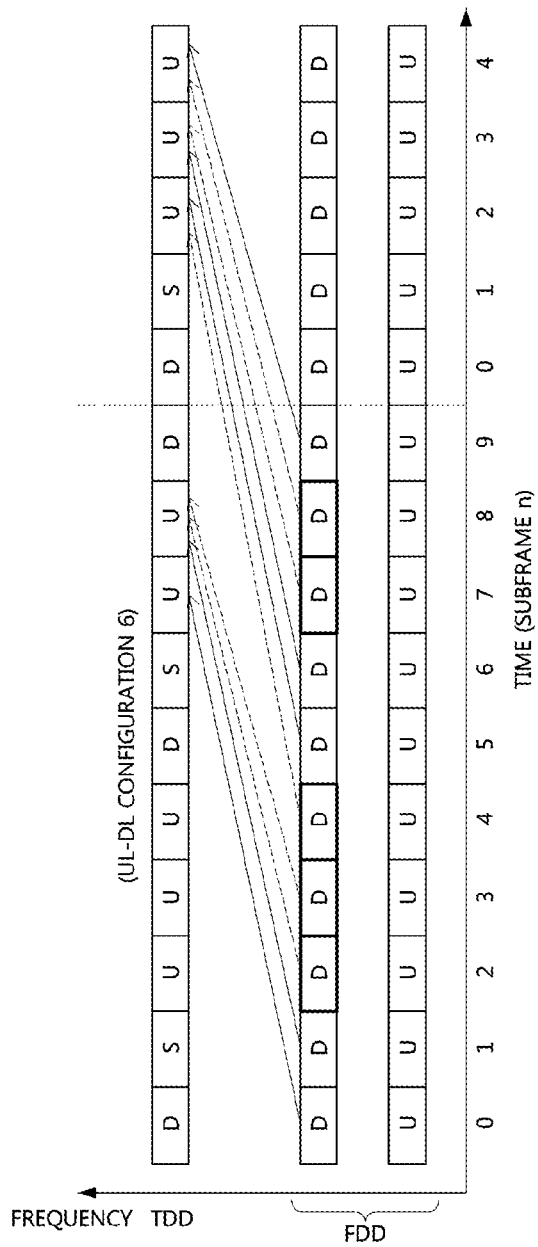
FIG. 13 is conceptual diagrams illustrating downlink transmission UL-DL subframe relations of a FDD secondary cell (that is, a case when a UL-DL configuration of the TDD cell is 6 in the method 2-5) when a TDD cell is a primary cell.

FIG. 7 is a conceptual diagram illustrating downlink transmission UL-DL subframe relations of a FDD secondary cell when a TDD cell is a primary cell (that is, when a UL-DL configuration is 0 in the method 2-5), and FIG. 8 is a conceptual diagram illustrating downlink transmission UL-DL subframe relations of a FDD secondary cell when a TDD cell is a primary cell (that is, when a UL-DL configuration is 1 in the method 2-5), and FIG. 9 is a conceptual diagram illustrating downlink transmission UL-DL subframe relations of a FDD secondary cell when a TDD cell is a primary cell (that is, when a UL-DL configuration is 2 in the method 2-5), and FIG. 10 is a conceptual diagram illustrating downlink transmission UL-DL subframe relations of a FDD secondary cell when a TDD cell is a primary cell (that is, when a UL-DL configuration is 3 in the method 2-5), and FIG. 11 is a conceptual diagram illustrating downlink transmission UL-DL subframe relations of a FDD secondary cell when a TDD cell is a primary cell (that is, when a UL-DL configuration is 4 in the method 2-5), and FIG. 12 is a conceptual diagram illustrating downlink transmission UL-DL subframe relations of a FDD secondary cell when a TDD cell is a primary cell (that is, when a UL-DL configuration is 5 in the method 2-5), and FIG. 13 is a conceptual diagram illustrating downlink transmission UL-DL subframe relations of a FDD secondary cell when a TDD cell is a primary cell (that is, when a UL-DL configuration is 6 in the method 2-5).

Referring to FIGS. 7 to 13, illustrated are UL-DL subframe relations of the FDD cell according to the method 2-5 when the TDD cell is a primary cell, and the FDD cell is a secondary cell, and the UL-DL configuration of the TDD cell is one of 0-6. The downlink transmission UL-DL subframe relations about the UL-DL configuration of the TDD primary cell may be used in the FDD secondary cell. Also, additional UL-DL subframe relations may be defined in order to make PDSCH transmission in all downlink subframe of the FDD cell possible. When additional subframe relations are defined, if a first downlink subframe among arbitrary two downlink subframes is temporally earlier than a second downlink subframe, an uplink subframe corresponding to the first downlink subframe can be configured as an uplink subframe which is identical to an uplink frame corresponding to the second downlink subframe or is temporally earlier than the uplink frame corresponding to the second downlink subframe. This means that priority of scheduling is maintained, so that a HARQ-ACK for a PDSCH received earlier should be transmitted not later than a HARQ-ACK for a PDSCH received later.

When the above-described subframe relations are used, a processing time used for the terminal to decode each PDSCH may be distributed in roughly uniform manner. Also, for efficient uses of uplink resources, it is desirable that the subframe relations are defined so that the number of downlink subframes corresponding to a single uplink subframe is distributed uniformly. In cases of UL-DL configurations 2, 3, 4, and 5 (that is, cases illustrated in FIGS. 9, 10, 11, and 12), a single HARQ-ACK transmission subframe corresponding to downlink subframes of the FDD cell for which additional relations are defined may be uniquely determined. However, in cases of UL-DL configurations 0, 1, and 6 (that is, cases illustrated in FIGS. 7, 8, and 13), two uplink subframes which are mapped for transmitting HARQ-ACK may exist in the downlink subframe of single FDD cell. In this case, the relations may be determined based on the above-described methods.

A below table 4 represents an example of K ($\{k_0, k_1, \ldots, k_{M-1}\}$) which is downlink assignment index set for the FDD secondary cell according to the method 2-5. That is, the below table 4 represents HARQ timings illustrated in FIGS. 7 to 13 as downlink assignment sets.

TABLE 4

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5, 6 | 4, 5 | 4 | — | — | 5, 6 | 4, 5 | 4 |
| 1 | — | — | 5, 6, 7 | 4, 5 | — | — | — | 5, 6, 7 | 4, 5 | — |
| 2 | — | — | 4, 5, 6, 7, 8 | — | — | — | — | 4, 5, 6, 7, 8 | — | — |
| 3 | — | — | 6, 7, 8, 9, 10, 11 | 5, 6 | 4, 5 | — | — | — | — | — |

TABLE 4-continued

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 4 | — | — | 7, 8, 9, 10, 11, 12 | 4, 5, 6, 7 | — | — | — | — | — | — |
| 5 | — | — | 4, 5, 6, 7, 8, 9, 10, 11, 12, 13 | — | — | — | — | — | — | — |
| 6 | — | — | 7, 8 | 6, 7 | 5, 6 | — | — | 7 | 5, 6, 7 | — |

When the UL-DL configuration of the TDD primary cell is 0 and a HARQ-ACK is transmitted through only uplink subframes 2, 4, 7, and 9 of the TDD primary cell, HARQ timing shown in a below table 5 can be obtained from the table 4. In other words, uplink subframes 3 and 8 are not used for HARQ-ACK transmission. Instead, uplink subframes adjacent to the subframes 3 and 8 are used for HARQ-ACK transmission. The table 5 represents an example of K ($\{k_0, k_1, \ldots, k_{M-1}\}$) which is downlink assignment index set for the FDD secondary cell. Referring to the table 5, since only uplink subframes configured for HARQ-ACK transmission are used in the TDD primary cell, new subframes may not be considered for managing HARQ-ACK resources.

TABLE 5

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 5, 6, 7 | 4, 5 | — | — | — | 5, 6, 7 | 4, 5 | — |
| 2 | — | — | 4, 5, 6, 7, 8 | — | — | — | — | 4, 5, 6, 7, 8 | — | — |
| 3 | — | — | 6, 7, 8, 9, 10, 11 | 5, 6 | 4, 5 | — | — | — | — | — |
| 4 | — | — | 7, 8, 9, 10, 11, 12 | 4, 5, 6, 7 | — | — | — | — | — | — |
| 5 | — | — | 4, 5, 6, 7, 8, 9, 10, 11, 12, 13 | — | — | — | — | — | — | — |
| 6 | — | — | 7, 8 | 6, 7 | 5, 6 | — | — | 7 | 5, 6, 7 | — |

Meanwhile, referring to the table 4, only HARQ-ACK transmissions through the FDD secondary cell are considered and simultaneous HARQ-ACK transmissions through the TDD primary cell and the FDD secondary cell are not considered when HARQ-ACK transmissions are distributed for uplink resource efficiency. When the UL-DL configuration of the TDD primary cell is 1, at most two HARQ-ACK transmissions corresponding to downlink transmission of the TDD primary cell can be performed through subframes 2 and 7, and at most one HARQ-ACK transmission corresponding to downlink transmission of the TDD primary cell can be performed through subframes 3 and 8. Therefore, when the method according to the table 4 is applied, at most five HARQ-ACK transmissions corresponding to downlink transmissions both of the TDD primary cell and the FDD secondary cell can be performed through subframes 2 and 7, and at most three HARQ-ACK transmissions corresponding to them can be performed through subframes 3 and 8. In order to resolve the above-mentioned HARQ-ACK non-uniformity problem, subframe relations according to a below table 6 may be applied when the UL-DL configuration of the TDD primary cell is 1 in the method 2-5 according to the table 4. The table 6 represents an example of K ($\{k_0, k_1, \ldots, k_{M-1}\}$) which is downlink assignment index set for the FDD secondary cell.

TABLE 6

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 1 | — | — | 6, 7 | 4, 5, 6 | — | — | — | 6, 7 | 4, 5, 6 | — |

In the method according to the table 4, when the UL-DL configuration of the TDD primary cell is 6, a HARQ-ACK transmission delay for the downlink subframe 4 of the FDD secondary cell may be 8 ms. Thus, timings according to a below table 7 may be applied in order to reduce the HARQ-ACK transmission delay for the downlink subframe 4. In case that the method is applied, since the HARQ-ACK for the downlink subframe 4 of the FDD secondary cell is transmitted through an uplink subframe 8 of the TDD primary cell, its transmission delay can be reduced to 4 ms.

However, there is a problem that HARQ-ACKs are further concentrated on the uplink subframe 8 of the TDD primary cell. The table 7 represents an example of K ($\{k_0, k_1, \ldots, k_{M-1}\}$) which is downlink assignment index set for the FDD secondary cell.

TABLE 7

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 6 | — | — | 7 | 6, 7 | 5, 6 | — | — | 7 | 4, 5, 6, 7 | — |

A below table 8 represents other example of K ($\{k_0, k_1, \ldots, k_{M-1}\}$) which is downlink assignment index set for the FDD secondary cell according to the method 2-5. That is, the below table 8 represents other examples of HARQ timings of the FDD secondary cell according to the UL-DL configurations of the TDD primary cell, which are obtained by applying the method 2-5. Here, newly added UL-DL subframe relation may have possibly minimal gap between a transmission time of a PDSCH and a transmission time of a HARQ-ACK corresponding to the PDSCH.

TABLE 8

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4, 5, 6 | 4 | 4 | — | — | 4, 5, 6 | 4 | 4 |
| 1 | — | — | 4, 5, 6, 7 | 4 | — | — | — | 4, 5, 6, 7 | 4 | — |
| 2 | — | — | 4, 5, 6, 7, 8 | — | — | — | — | 4, 5, 6, 7, 8 | — | — |
| 3 | — | — | 6, 7, 8, 9, 10, 11 | 5, 6 | 4, 5 | — | — | — | — | — |
| 4 | — | — | 7, 8, 9, 10, 11, 12 | 4, 5, 6, 7 | — | — | — | — | — | — |
| 5 | — | — | 4, 5, 6, 7, 8, 9, 10, 11, 12, 13 | — | — | — | — | — | — | — |
| 6 | — | — | 7, 8, 9, 10 | 7 | 5, 6, 7 | — | — | 7 | 7 | — |

(Method 2-6) New DL/UD subframe relations between downlink subframes of the FDD secondary cell and uplink subframes of the TDD primary cell may be defined.

In the method 2-4, the UL-DL subframe relations include the convention transmission timing relations of the FDD cell. Also, in the method 2-5, the UL-DL subframe relations include convention transmission timing relations of the TDD cell. However, the method 2-6 means new comprehensive UL-DL subframe relations including a case in which the UL-DL subframe relations related to the method 2-4 and 2-5 are not existed.

A below table 9 represents an example of K ($\{k_0, k_1, \ldots, k_{M-1}\}$) which is downlink assignment index set for the FDD secondary cell according to the method 2-6. That is, the below table 9 represents other examples of HARQ timings of the FDD secondary cell according to the UL-DL configurations of the TDD primary cell, which are obtained by applying the method 2-6. Here, uplink HARQ-ACKs may be configured as distributed uniformly on uplink subframes of the TDD primary cell. Also, identically to the above-described methods, a HARQ-ACK for a PDSCH received earlier is configured to be transmitted not later than a HARQ-ACK for a PDSCH received later. As compared to the methods according to the tables 3, 4, and 5, the method according to the table 9 can use uplink resources more efficiently so that performance of HARQ-ACK reception can be enhanced. However, there may be a shortcoming that a transmission delay between a PDSCH and a HARQ-ACK corresponding to the PDSCH is longer than those of other methods.

TABLE 9

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5, 6 | 4, 5 | 4 | — | — | 5, 6 | 4, 5 | 4 |
| 1 | — | — | 5, 6, 7 | 4, 5 | — | — | — | 5, 6, 7 | 4, 5 | — |
| 2 | — | — | 4, 5, 6, 7, 8 | — | — | — | — | 4, 5, 6, 7, 8 | — | — |
| 3 | — | — | 8, 9, 10, 11 | 6, 7, 8 | 4, 5, 6 | — | — | — | — | — |
| 4 | — | — | 8, 9, 10, 11, 12 | 4, 5, 6, 7, 8 | — | — | — | — | — | — |
| 5 | — | — | 4, 5, 6, 7, 8, 9, 10, 11, 12, 13 | — | — | — | — | — | — | — |
| 6 | — | — | 6, 7 | 5, 6 | 4, 5 | — | — | 5, 6 | 4, 5 | — |

As another example of the method 2-6, a method according to a below table 10 can be considered. A below table 10 represents another example of K ($\{k_0, k_1, \ldots, k_{M-1}\}$) which is downlink assignment index set for the FDD secondary cell according to the method 2-6. In this method, UD-DL subframe relations may be defined by using only uplink subframes of the TDD cell through HARQ-ACK can be transmitted according to the conventional LTE specification. That is, when the UL-DL configuration of the TDD primary cell is 0, uplink subframes 3 and 8 may be configured not to be used for HARQ-ACK transmission identically to the existing LTE specification. Also, identically to the case of the table 9, uplink HARQ-ACKs may be configured to be distributed uniformly on uplink subframes of the TDD primary cell, and a HARQ-ACK for a PDSCH received earlier is configured to be transmitted not later than a HARQ-ACK for a PDSCH received later.

TABLE 10

| UL-DL Configuration of TDD primary cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4, 5, 6 | | 4, 5 | — | — | 4, 5, 6 | | 4, 5 |
| 1 | — | — | 5, 6, 7 | 4, 5 | — | — | — | 5, 6, 7 | 4, 5 | — |
| 2 | — | — | 4, 5, 6, 7, 8 | — | — | — | — | 4, 5, 6, 7, 8 | — | — |
| 3 | — | — | 8, 9, 10, 11 | 6, 7, 8 | 4, 5, 6 | — | — | — | — | — |
| 4 | — | — | 8, 9, 10, 11, 12 | 4, 5, 6, 7, 8 | — | — | — | — | — | — |
| 5 | — | — | 4, 5, 6, 7, 8, 9, 10, 11, 12, 13 | — | — | — | — | — | — | — |
| 6 | — | — | 6, 7 | 5, 6 | 4, 5 | — | — | 5, 6 | 4, 5 | — |

As a next, a case that a CIF is configured for the FDD secondary cell, and a cross-carrier scheduling is performed in the TDD primary cell will be explained. When the FDD secondary cell is cross-carrier-scheduled by the TDD secondary cell whose UL-DL configuration is identical to the UL-DL configuration of the TDD primary cell, below methods may be applied.

When the cross-carrier scheduling is used, PDSCH scheduling information transmitted through a component carrier can schedule PDSCH on a subframe of other component carrier which corresponds to a current subframe. That is, if the conventional cross-carrier scheduling scheme is used without any change, there may be a shortcoming that PDSCH of the FDD secondary cell can be scheduled on only downlink subframes which correspond to downlink subframes and special subframes of the TDD primary cell.

In spite of the above shortcoming, when the conventional cross-carrier scheduling scheme is used without any change, the method 2-5 among the above-described methods may be the best method. Specifically, since HARQ timing relations of the TDD primary cell exist in the method 2-5, the cross-carrier scheduling scheme can be applied to all downlink subframes and special subframes of the TDD primary cell, and accordingly PDSCH of the FDD secondary cell can be scheduled. On the contrary, if PDSCH of the FDD cell is scheduled by some part of downlink subframes and special subframes of the TDD cell in the cross-carrier scheduling manner, since a subframe of the TDD primary cell through which a HARQ-ACK corresponding to the PDSCH should be transmitted may not be an uplink subframe, a case that PDSCH cannot be scheduled may occur.

(Method 2-7) A UL-DL configuration of the TDD primary cell may be used as a DL-reference UL-DL configuration of the FDD secondary cell. Also, a multi-subframe-scheduling scheme or a cross-subframe-scheduling scheme may be used. When the cross-carrier scheduling scheme is used, the several subframes following a current subframe can be scheduled as well as the current subframe by applying the multi-subframe-scheduling scheme or the cross-subframe-scheduling scheme.

Figure 14:
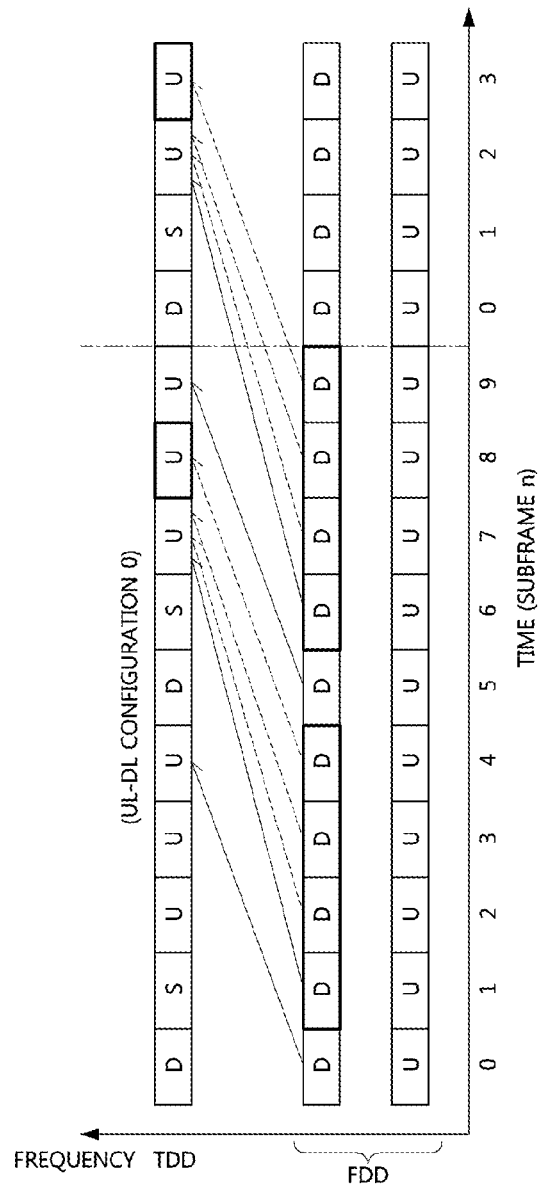
FIG. 14 is conceptual diagrams illustrating downlink transmission UL-DL subframe relations of a FDD secondary cell (that is, a case when a UL-DL configuration of the TDD primary cell is 0 in the method 2-7) when a TDD cell is a primary cell.

FIG. 14 is a conceptual diagram illustrating downlink transmission UL-DL subframe relations of a FDD secondary cell when a TDD cell is a primary cell. That is, FIG. 14 illustrates a case when a UL-DL configuration of the TDD primary cell is 0 in the method 2-7.

Referring to FIG. 14, when the TDD cell is a primary cell, and the FDD cell is a secondary cell, and the UL-DL configuration of the TDD cell is 0, the UL-DL configuration of the TDD cell may be used as a DL-reference UL-DL configuration of the FDD secondary cell. Also, when the remaining FDD downlink subframes are scheduled by the multi-subframe-scheduling scheme or cross-subframe-scheduling scheme, the several subframes following a current subframe can be scheduled as well as the current subframe through the cross-carrier-scheduling scheme.

Here, some or all of downlink subframes 1, 2, 3, and 4 of the FDD cell can be scheduled by a subframe 1 of the TDD cell, and some or all of downlink subframes 6, 7, 8, and 9 of the FDD cell can be scheduled by a subframe 6 of the TDD cell. In this case, additional subframe relations should be defined between PDSCHs scheduled in the FDD cell and HARQ-ACKs corresponding to the PDSCHs. Also, in order for downlink subframes of all FDD cells to be scheduled, the number of subframes which can be simultaneously scheduled should be at least 4 in consideration of all TDD UL-DL configurations of the table 1.

Meanwhile, in case that a HARQ-ACK corresponding to PDSCH or PDCCH instructing downlink SPS release is transmitted as piggybacked on PUSCH, a base station may use a downlink assignment index (DAI) field of 2 bits (refer to a table 11) included in an uplink grant in order to notify the terminal of the number of the scheduled PDSCH or the scheduled PDCCH instructing downlink SPS release. A below table 11 provides descriptions about DAI. Since ACKs or NACK for at most 9 PDSCH or PDCCH instructing downlink SPS release can be transmitted in a single uplink subframe for each component carrier in the LTE-TDD mode (that is, when a UL-DL configuration=5), a terminal can obtain a value of 0 to 9 by decoding the uplink DAI information of 2 bits based on a modulo operation (refer to the table 11).

TABLE 11

| DAI MSB, LSB | $V_{DAI}^{UL}$ or $V_{DAI}^{DL}$ | Number of subframes of PDSCHs and PDCCHs instruction downlink SPS release |
|---|---|---|
| 0, 0 | 1 | 1, 5, or 9 |
| 0, 1 | 2 | 2 or 6 |
| 1, 0 | 3 | 3 or 7 |
| 1, 1 | 4 | 0, 4, or 8 |

In a CA based wireless communication system comprising a TDD primary cell and a FDD secondary cell, if a PUSCH of the FDD cell exists at the time of HARQ-ACK transmission, a HARQ-ACK can be transmitted as piggybacked on the PUSCH of the FDD cell. In this case, a base station may introduce a DAI field into an uplink grant of the FDD cell in order to notify the terminal of the number of PDCCHs allocated for each component carrier. The DAI field of the FDD cell can be configured with 2 bits identically to that of the DAI field of the TDD cell. At this time, if HARQ timings corresponding to the above-described tables 3 to 11 are applied, at most 10 PDSCHs or PDCCHs instructing downlink SPS release, for each component carrier, can be matched to a single uplink subframe of the FDD secondary cell (that is, when the UL-DL configuration is 5). Thus, the terminal can obtain at most 10 values based on the DAI field. For this, when the DAI field is configured as (MSB, LSM)=(0,1) (as shown in a table 12), the terminal may add a value indicating 10-th subframe which can be obtained by a modulo operation.

TABLE 12

| DAI MSB, LSB | $V_{DAI}^{UL}$ or $V_{DAI}^{DL}$ | Number of subframes of PDSCHs and PDCCHs instruction downlink SPS release |
|---|---|---|
| 0, 0 | 1 | 1, 5, or 9 |
| 0, 1 | 2 | 2, 6, or 10 |
| 1, 0 | 3 | 3 or 7 |
| 1, 1 | 4 | 0, 4, or 8 |

Meanwhile, in order to maximize downlink capacity of the TDD cell, new TDD UL-DL configurations 7, 8, and 9, which are shown in a table 13, may be introduced. Since PUCCH transmission is impossible when the UL-DL configuration of the TDD cell is 7, 8, or 0, the TDD cell cannot operate as a primary cell. Instead, the TDD cell can operate only as a secondary cell when a FDD cell or a TDD cell whose UL-DL configuration is set to one of 0 to 6 operates as a primary cell.

TABLE 13

| UL-DL Configuration | DL-UL Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 7 | 5 ms | D | S | D | D | D | D | S | D | D | D |
| 8 | 10 ms | D | S | D | D | D | D | D | D | D | D |
| 9 | — | D | D | D | D | D | D | D | D | D | D |

When the UL-DL configurations of the table 13 are introduced, if two TDD cells are carrier-aggregated, a UL-DL configuration of a TDD primary cell can be set to one of 0 to 6, a the UL-DL configuration of a TDD secondary cell can be set to one of 7 to 9. In this case, downlink transmission can be performed on all subframes of a radio frame in the TDD secondary cell. Thus, in an aspect of downlink PDSCH transmission, the TDD secondary cell may be equal to a FDD cell. Therefore, the above-described all downlink HARQ transmission methods may identically be applied to a CA scenario in which the TDD primary cell is configured to one of UL-DL configuration 0 to 6 and the TDD secondary cell is configured to one of UL-DL configuration 7 to 9. That is, a DL-reference UL-DL configuration of the TDD primary cell follows a UL-DL configuration of the TDD primary cell, and the above-described timing methods for the FDD secondary cell may identically be applied before the DL-reference UL-DL configuration of the TDD secondary cell. That is, downlink HARQ timing of the TDD primary cell may be identical to the TDD timing about the UL-DL configuration of the TDD primary cell, and the downlink HARQ timing of the TDD secondary cell may identically be applied to above-described the timing methods of the FDD secondary cell.

Method for Uplink HARQ Transmission

Next, in the CA system including the FDD cell and the TDD cell, the method for uplink HARQ transmission (that is, the method for the terminal to receive uplink grant including the PUSCH scheduling information from the base station and transmit the PUSCH) and the method for receiving HARQ-ACK indicating whether or not the PUSCH is retransmitted will be explained.

One of purposes of introducing a UL-reference UL-DL configuration is to determine a relation between a downlink subframe through which an uplink grant or a physical hybrid-ARQ indicator channel (PHICH) is transmitted and an uplink subframe through which a PUSCH is transmitted. In the LTE-TDD mode according to the conventional LTE specification, when a UL-reference UL-DL configuration belongs to {1,2,3,4,5,6} and a normal HARQ operation is assumed, if a PDCCH/EPDCCH including DCI or a PHICH is detected at a n-th subframe, a PUSCH corresponding to it can be transmitted at a (n+k)-th subframe. Here, k may be obtained from a table 14.

TABLE 14

| TDD UL-DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Hereinafter, a terminal configured for a CA comprising at least one FDD cell and at least one TDD cell will be considered. If a serving cell of the terminal is a primary cell or a serving cell which does not use CIF, a UL-DL configuration of the corresponding serving cell may be used as a UL-reference UL-DL configuration of the serving cell. That is, if the serving cell is a primary cell or the serving cell performs a self-scheduling (does not perform a cross-carrier scheduling), an uplink grant (or, PHICH) is transmitted only through the serving cell, and a corresponding PUSCH is also transmitted only through the serving cell. Thus, a temporal relation between the uplink grant (or, PHICH) and the PUSCH is determined in consideration of only the UL-DL configuration of the serving cell.

A table 15 represents a subframe relation between a PUSCH of the TDD cell and a PHICH of the TDD cell based on a given UL-DL configuration of the TDD cell. That is, the table 5 represents k for PHICH of the TDD cell. In the table 15, if a PUSCH is transmitted at a n-th subframe, a PHICH including a HARQ-ACK corresponding to the PUSCH is transmitted at a (n+k)-th subframe.

TABLE 15

| TDD UL-DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

Hereinafter, in a CA based wireless communication system comprising at least one FDD cell and at least one TDD cell, when a serving cell is a secondary cell and is configured to use CIF, method to determine, for the serving cell, a relation between an uplink grant (or, PHICH) and a PUSCH, and a relation between a PUSCH and a PHICH will be explained.

A Case where a TDD Serving Cell is Cross-Carrier-Scheduled by a FDD Cell

When a FDD cell is another serving cell performing a cross-carrier scheduling on a TDD serving cell (that is, when the TDD serving cell is cross-carrier-scheduled by the FDD serving cell), since downlink subframes always exist in the FDD cell, there is no restriction on a subframe used to transmit PDCCH/EPDCCH (or, PHICH) of the TDD serving cell for all UL-DL configurations of the TDD cell. In this case, a subframe relation between an uplink grant (or, PHICH) and a PUSCH, which are for the TDD cell, is based on a FDD scheme or a TDD scheme. Also, since a cross-carrier scheduling is performed by the FDD cell, a downlink HARQ-ACK corresponding to a PUSCH of the TDD cell may be transmitting through a PHICH of the FDD cell. The FDD scheme and the TDD scheme may be applied to subframe relation between a subframe through which a PUSCH is transmitted and a subframe through which a PHICH corresponding the PUSCH is transmitted. If all possible combinations are considered, four different relations may exist as shown in a table 16 about the UL-DL subframe relations for PUSCH transmission of the TDD serving cell.

TABLE 16

| | Mapping between uplink grant (or, PHICH) and PUSCH | Mapping between PUSCH and PHICH |
|---|---|---|
| Method 3-1 | FDD | New FDD timing |
| Method 3-2 | TDD | TDD |
| Method 3-3 | FDD | TDD |
| Method 3-4 | TDD | FDD |

(Method 3-1) The conventional FDD timing relations are applied to the PDCCH/EPDCCH (or, PHICH)-PUSCH subframe relations of the TDD cells, and new FDD timing relations are applied to the PUSCH-PHICH subframe relations. When the uplink grant (or, PHICH) is received through the n-th subframe, the terminal may transmit the PUSCH in response to the received uplink grant (or PHICH) through (n+4)-th subframe. When the PUSCH is received through n-th subframe, the base station may transmit the PHICH in response to the received PUSCH through (n+6)-th subframe.

Figure 15:
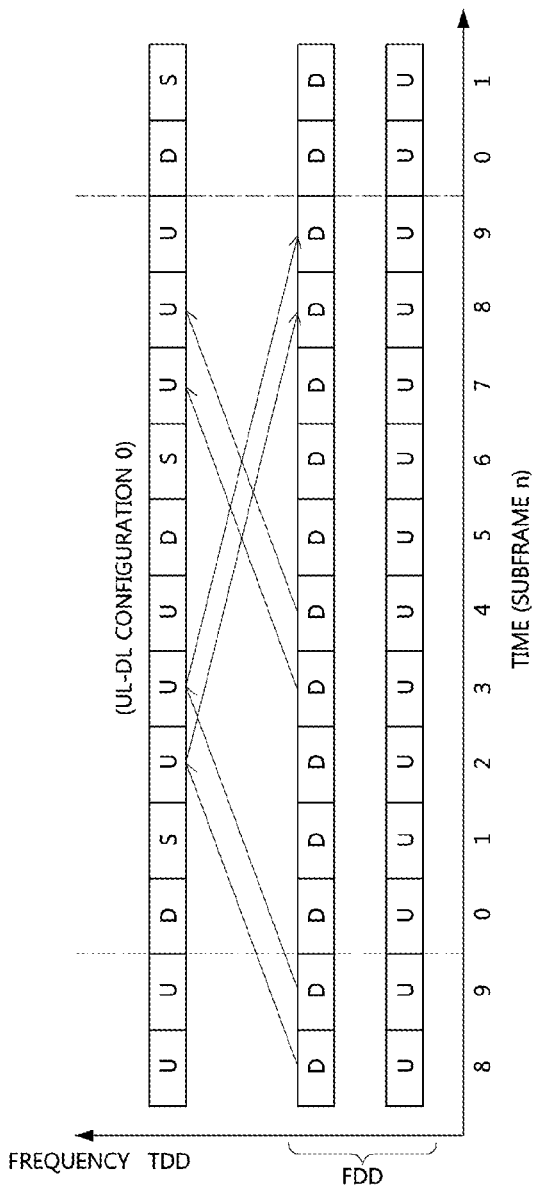
FIG. 15 is a conceptual diagram illustrating subframe relations of PDCCH/EPDCCH, PHICH, and PUSCH in a TDD cell (that is, a case when a UL-DL configuration of the TDD cell is 0 in the method 3-1) when the TDD cell is cross-carrier-scheduled by a FDD cell.

FIG. 15 is a conceptual diagram illustrating subframe relations of PDCCH/EPDCCH, PHICH, and PUSCH in a TDD cell (that is, a case when a UL-DL configuration of the TDD cell is 0 in the method 3-1) when the TDD cell is cross-carrier-scheduled by a FDD cell.

If the conventional FDD timing relations (that is, a PHICH corresponding to a PUSCH transmitted at a n-th subframe are transmitted at a (n+4)-th subframe) is used, a HARQ round-trip (RTT) time becomes 8 ms. Thus, there may not be an uplink subframe at a time when a PUSCH should be retransmitted from the TDD cell.

Meanwhile, when the method 3-1 is used, a HARQ RTT time becomes 10 ms. Therefore, since an uplink subframe always exists at a time when a PUSCH should be retransmitted from the TDD cell, the above-described problem of the conventional FDD timing can be resolved. The reason why the representation 'New FDD timing' is used in the table 16 is that there exists a fixed relation (that is, n and (n+6)) similar to the FDD schemes independently of UL-DL configuration and a subframe number which are used in the TDD scheme.

The following two methods may be considered as methods modified from the method 3-1.

(Method 3-1a) A new FDD timing relations may be used for determining a relation between PDCCH/EPDCCH (or, PHICH) and PUSCH, and for determining a relation between PUSCH and PHICH. For example, when a terminal receives an uplink grant (or, PHICH) at a n-th subframe, the terminal may transmit a corresponding PUSCH at a (n+5)-th subframe. Also, when a base station receives a PUSCH at a n-th subframe, the base station may transmit a corresponding PHICH at a (n+5)-th subframe.

(Method 3-1b) A new FDD timing relations may be used for determining a relation between PDCCH/EPDCCH and PUSCH, and the conventional FDD timing relations may be used for determining a relation between PUSCH and PHICH. For example, when a terminal receives an uplink grant (or, PHICH) at a n-th subframe, the terminal may transmit a corresponding PUSCH at a (n+6)-th subframe. Also, when a base station receives a PUSCH at a n-th subframe, the base station may transmit a corresponding PHICH at a (n+4)-th subframe.

Since, when the method 3-1a or 3-1b is used, the HARQ RTT time becomes 10 ms similarly to that of the method 3-1, the method 3-1a or 3-1b is suitable as a synchronous uplink HARQ scheme, and can resolve the above-described problem occurring when the conventional FDD timing is adopted.

(Method 3-2) The TDD timing relations of the UL-DL configuration of the TDD cell may be applied to PDCCH/EPDCCH (or, PHICH)-PUSCH subframe relations and PUSCH-PHICH subframe relations of the TDD cell. That is, the UL-DL configuration of the TDD cell may be used as UL reference UL-DL configuration of the TDD cell.

Figure 16:
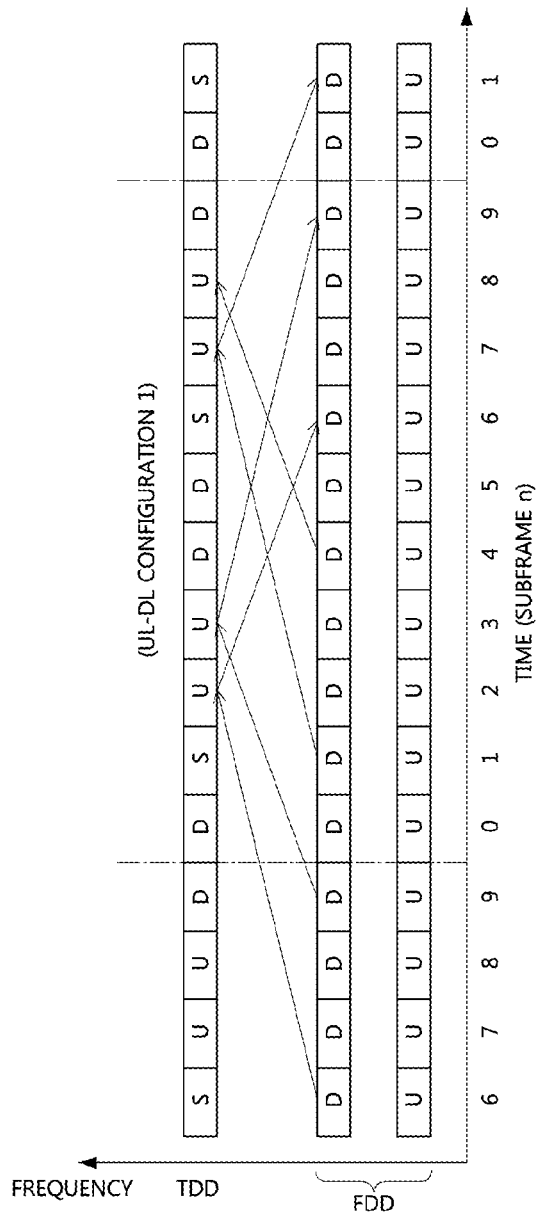
FIG. 16 is a conceptual diagram illustrating subframe relations of PDCCH/EPDCCH, PHICH, and PUSCH in a TDD cell (that is, a case when a UL-DL configuration of the TDD cell is 1 in the method 3-2) when the TDD cell is cross-carrier-scheduled by a FDD cell.

FIG. 16 is a conceptual diagram illustrating subframe relations of PDCCH/EPDCCH, PHICH, and PUSCH in a TDD cell (that is, a case when a UL-DL configuration of the TDD cell is 1 in the method 3-2) when the TDD cell is cross-carrier-scheduled by a FDD cell.

Since a PUSCH is transmitted through the TDD cell, the method 3-2, to which the TDD timing is applied, is advantageous in an aspect of resource management. Especially, if a multi-user multiple input multiple output (MU-MIMO) pairing is considered, any terminal (that is, both of a terminal using only the corresponding TDD cell without carrier aggregation and a terminal using the TDD cell which is cross-carrier-scheduled) may transmit a PUSCH through the TDD cell based on identical relation between PDCCH/EPDCCH (or, PHICH) and PUSCH. In aspect of MU-MIMO scheduling, a manner that PDCCH/EPDCCH (or, PHICH) transmission and PUSCH transmission for terminals using identical or overlapped resources are performed at always identical times is better for scheduling than a manner that PDCCH/EPDCCH (or, PHICH) transmission and PUSCH transmission are performed at different times which are not constant.

(Method 3-3) The FDD timing may be used for determining a relation between PDCCH/EPDCCH (or, PHICH) and PUSCH of the TDD cell, and the UL-DL configuration of the TDD cell may be used as a UL-reference UL-DL configuration of the TDD cell in order to determine a relation between PUSCH and PHICH.

(Method 3-4) A UL-DL configuration of a UL-reference UL-DL configuration of the TDD cell may be applied to PDCCH/EPDCCH (or, PHICH)-PUSCH subframe relations of the TDD cell, and the FDD timing may be used for determining a relation between PUSCH and PHICH.

Although methods applying different timing to each of the relation between an uplink grant (or, PHICH) and PUSCH and the relation between PUSCH and PHICH, such as the methods 3-3 and 3-4, can be considered, it may be difficult to use them as uplink synchronous HARQ schemes because the methods do not use unified timings differently from the methods 3-1 and 3-2. In a wireless communication system not using CA or a wireless communication system using CA comprising at least one FDD cell and/or at least one TDD cell, resource for each HARQ process of a FDD cell may be allocated with a periodicity of 8 subframes, and position of subframe to which resource for each uplink HARQ process of a TDD cell is allocated may be determined according to a UL-reference UL-DL configuration of the TDD cell.

In the synchronous uplink HARQ scheme, position of subframe to which a resource for each uplink HARQ process of a cell is predetermined, and resources for different HARQ processes may not be allocated to a same subframe. If different timing is applied to each of the temporal relation between an uplink grant (or, PHICH) and PUSCH and the temporal relation between PUSCH and PHICH like the methods 3-3 and 3-4, resources for different HARQ processes may be allocated to a same subframe. According to the subframe relations of the FDD manner, PUSCH resources can be allocated with a periodicity of 8 subframes. Also, according to the subframe relations of the TDD manner, PUSCH resources can be generally allocated with a periodicity of 10 subframes.

For example, when the method 3-4 is used and a subframe relation is determined based on a TDD UL-DL configuration 1, 'n->(n+4)' or 'n->(n+6)' may be used as a relation between uplink grant (or, PHICH) and PUSCH. If a FDD timing is applied, 'n->(n+4)' may be used as a relation between PUSCH and PHICH. Thus, resources for HARQ process may be allocated with a periodicity of 8 or 10 subframes. In this case, a relation between a subframe through which a first uplink grant (or, PHICH) is transmitted and a next PHICH may be 'n->(n+8)' or 'n->(n+10)'. In case of 'n->(n+8)', since a case that the subframe for the next PHICH (that is, a (n+10)-th subframe) is not a downlink subframe ('D') or a special subframe ('S') may occur, there is a problem that a new relation between uplink grant (or, PHICH) and PUSCH should be added. Also, although the subframe for the next PHICH (that is, a (n+10)-th subframe) is always a downlink subframe ('D') or a special subframe ('S'), there may be a collision between resources for different HARQ processes. That is, HARQ process resources with a periodicity of 8 subframes and HARQ process resources with a periodicity of 10 subframes may be allocated to a same subframe. The above-described problem may occur also in the method 3-3. Therefore, the method applying different timings to determine the subframe relation between uplink grant (or, PHICH) and PUSCH and the subframe relation between PUSCH and PHICH, such as the methods 3-3 and 3-4, is not so desirable. When the TDD serving cell is cross-carrier-schedule by the FDD cell, the methods 3-1 and 3-2 can be considered preferentially.

A Case where a FDD Serving Cell is Cross-Carrier-Scheduled by a TDD Cell

In case that a FDD service cell is cross-carrier-scheduled by a TDD cell, since the cross-carrier scheduling is possible only in subframes through which the TDD cell can perform downlink transmission, there is restriction on subframes through which PDCCH/EPDCCH are transmitted. Thus, there is restriction on uplink PUSCH scheduling of the FDD cell.

First, a manner maintaining the restrictions on the subframes is considered. A timing between an uplink grant and a PUSCH may be configured according to a FDD manner or a TDD manner. Also, since the cross-carrier scheduling is performed by the TDD cell, a HARQ-ACK corresponding to the PUSCH of the FDD cell can be transmitted through a PHICH of the TDD cell. In this case, a temporal relation between PUSCH and PHICH in the TDD cell may be used for determining transmission time of the PHICH. However, FDD timing cannot be used for determining the transmission time of the PHICH. The reason is that, although a PHICH corresponding to a PUSCH received at a n-th subframe should be transmitted at a (n+4)-th subframe according to a FDD subframe relation, a (n+4)-th subframe of the TDD cell may not be a downlink subframe ('D') or a special subframe ('S'). In order to resolve the above-described problem, a method in which a PHICH is transmitted also by a cell not performing the cross-carrier-scheduling can be used. Also, as an alternative method, a new FDD timing different from the conventional FDD timing can be introduced.

Considering all the above-described cases, six different uplink HARQ transmission methods can be derived as a table 17. The flowing table 17 represents methods to determine UL/DL subframe relations for PUSCH of the TDD serving cell when the FDD cell is another serving cell. The methods 3-5 to 3-7 are methods in which unified timing schemes (that, TDD timing scheme for both or FDD timing scheme for both) are used for determining a temporal relation between PDCCH/EPDCCH (or, PHICH) and PUSCH and a temporal relation between PUSCH and PHICH. Meanwhile, the methods 3-8 to 3-10 are methods in which different timing scheme is used for each of the both temporal relations.

TABLE 17

| | Mapping between uplink grant (or, PHICH) and PUSCH | Mapping between PUSCH and PHICH |
|---|---|---|
| Method 3-5 | TDD | TDD |
| Method 3-6 | FDD | FDD timing + PHICH transmission in FDD cell |
| Method 3-7 | FDD | New FDD timing |
| Method 3-8 | FDD | TDD |
| Method 3-10 | TDD | FDD timing + PHICH transmission in FDD cell |
| Method 3-11 | TDD | New FDD timing |

Next, a method for determining UL-DL subframe relations of the FDD serving cell in the methods 3-5 to 3-7 will be explained.

(Method 3-5) The TDD timing relations of the UL-DL configuration of the TDD cell may be applied to PUSCH-PHICH subframe relations and PDCCH/EPDCCH (or, PHICH)-PUSCH subframe relations of the FDD cell.

Figure 17:
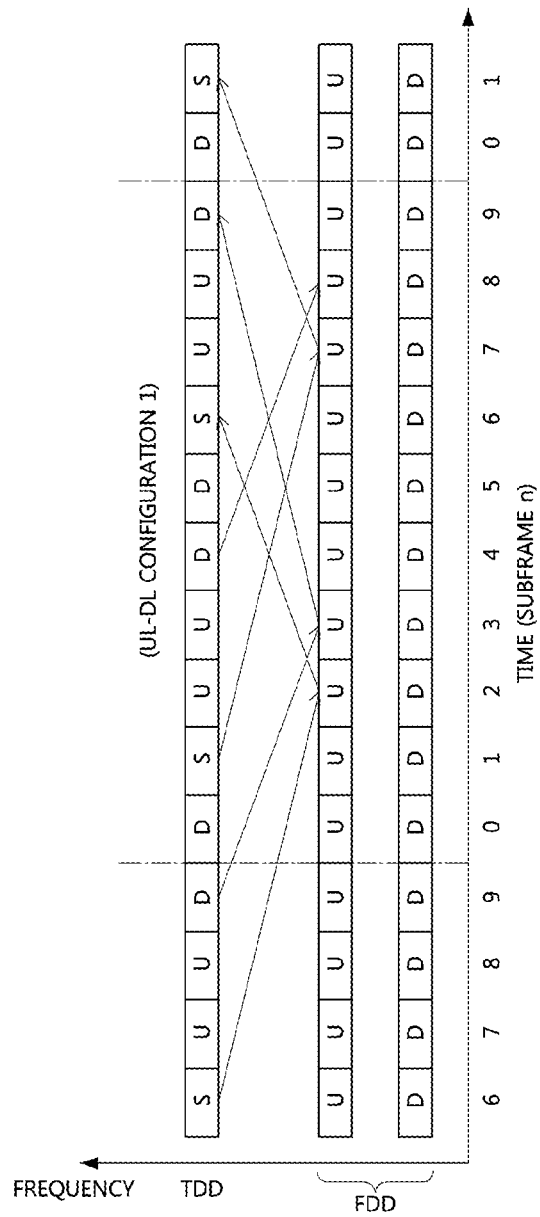
FIG. 17 is a conceptual diagram illustrating subframe relations of PDCCH/EPDCCH, PHICH, and PUSCH in a FDD cell (that is, a case when a UL-DL configuration of the TDD cell is 1 in the method 3-5) when the FDD cell is cross-carrier-scheduled by a TDD cell.

FIG. 17 is a conceptual diagram illustrating subframe relations of PDCCH/EPDCCH, PHICH, and PUSCH in a FDD cell (that is, a case when a UL-DL configuration of the TDD cell is 1 in the method 3-5) when the FDD cell is cross-carrier-scheduled by a TDD cell.

Referring to FIG. 17, since only subframe relations defined based on the UL-DL configuration of the TDD cell are used, downlink subframes of the TDD cell in which cross-carrier scheduling is not performed (that is, PDCCH/EPDCCH does not exist) may exist. Here, the cross-carrier scheduling may not be performed in the subframes 0 and 5 of the TDD cell.

Figure 18:
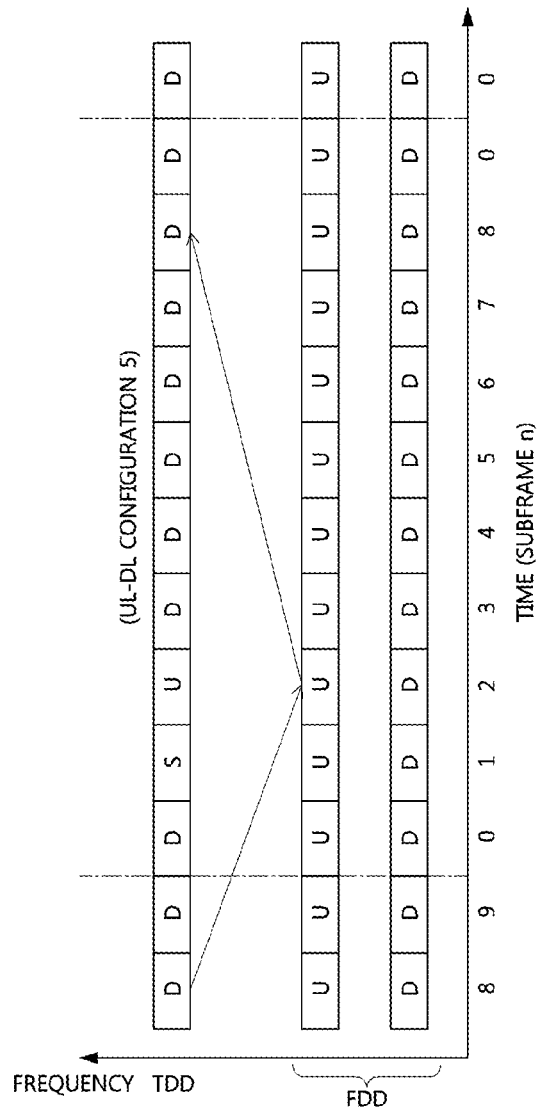
FIG. 18 is a conceptual diagram illustrating subframe relations of PDCCH/EPDCCH, PHICH, and PUSCH in a FDD cell (that is, a case when a UL-DL configuration of the TDD cell is 5 in the method 3-5) when the FDD cell is cross-carrier-scheduled by a TDD cell.

FIG. 18 is a conceptual diagram illustrating subframe relations of PDCCH/EPDCCH, PHICH, and PUSCH in a FDD cell (that is, a case when a UL-DL configuration of the TDD cell is 5 in the method 3-5) when the FDD cell is cross-carrier-scheduled by a TDD cell.

Referring to FIG. 18, even though totally 9 downlink subframe and special subframes exist in a single radio frame of the TDD cell, cross-carrier scheduling for the FDD scheduling is performed in only a subframe 8. Thus, a PUSCH can be transmitted through a subframe 2 of the FDD cell corresponding to a subframe 8 of the TDD cell. That is, a PUSCH cannot be transmitted through other subframes except the subframe 2 in the FDD cell.

(Method 3-6) The FDD timing relations may be applied to PDCCH/EPDCCH (or, PHICH)-PUSCH subframe relations and PUSCH-PHICH subframe relations of the FDD cell. The terminal may receive the PHICH through the FDD cell in which the PUSCH is transmitted to ensure transmission of the PHICH, in response to the PUSCH transmitted the n-th subframe, the (n+4)-th subframe. The method 3-6 is useful for the MU-MIMO scheduling as the method 3-2, because the FDD timing may be applied to the PUSCH transmission through the FDD cell. However, it may be generated that inter-cell interference of the control channel in the FDD cell when the PHICH transmission through the FDD cell is cross-carrier scheduled.

Figure 19:
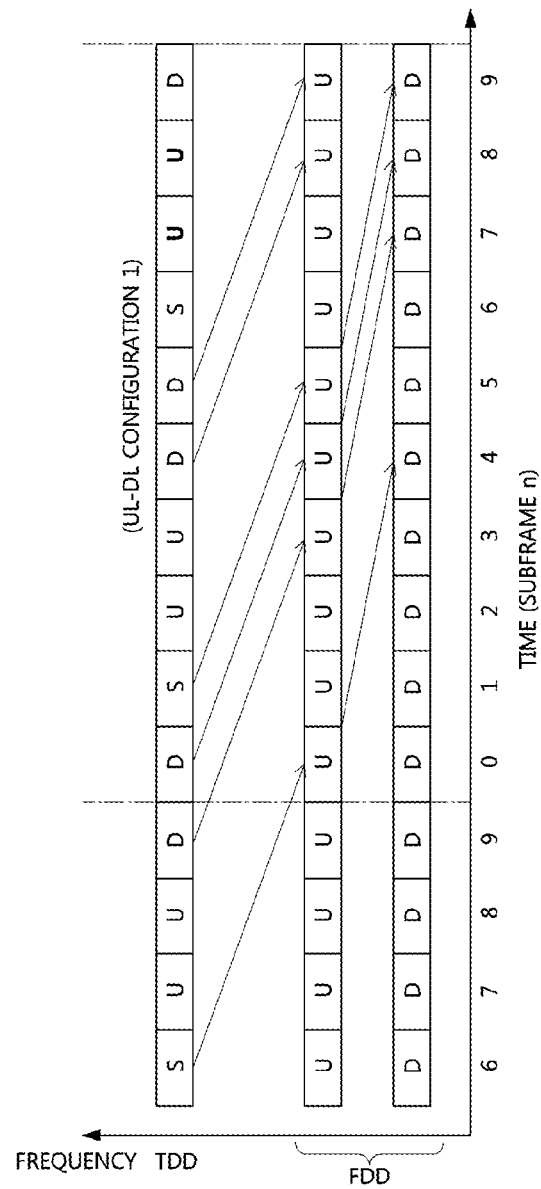
FIG. 19 is a conceptual diagram illustrating subframe relations of PDCCH/EPDCCH, PHICH, and PUSCH in a FDD cell (that is, a case when a UL-DL configuration of the TDD cell is 1 in the method 3-6) when the FDD cell is cross-carrier-scheduled by a TDD cell.

FIG. 19 is a conceptual diagram illustrating subframe relations of PDCCH/EPDCCH, PHICH, and PUSCH in a FDD cell (that is, a case when a UL-DL configuration of the TDD cell is 1 in the method 3-6) when the FDD cell is cross-carrier-scheduled by a TDD cell.

In the method 3-7, the conventional FDD timing scheme may be applied to the subframe relations of the PDCCH/EPDCCH (or, PHICH)-PUSCH, and new FDD timing scheme may be applied to the subframe relations of the PUSCH-PHICH. That is, the base station may transmit the PHICH, in response to PUSCH received through the n-th subframe, through the (n+6)-th subframe as new transmission timing. In the method 3-7, problems according to the conventional FDD timing scheme having 4 ms interval may be resolved, because the (n+6)-th subframe of the TDD cell is always D or S.

Figure 20:
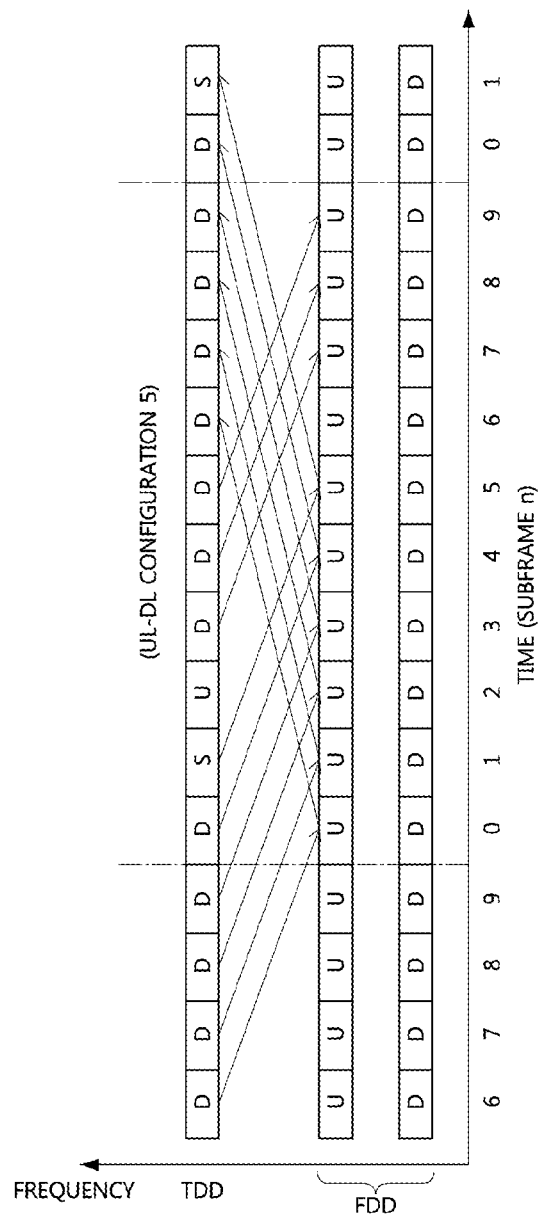
FIG. 20 is a conceptual diagram illustrating subframe relations of PDCCH/EPDCCH, PHICH, and PUSCH in a FDD cell (that is, a case when a UL-DL configuration of the TDD cell is 5 in the method 3-7) when the FDD cell is cross-carrier-scheduled by a TDD cell.

FIG. 20 is a conceptual diagram illustrating subframe relations of PDCCH/EPDCCH, PHICH, and PUSCH in a FDD cell (that is, a case when a UL-DL configuration of the TDD cell is 5 in the method 3-7) when the FDD cell is cross-carrier-scheduled by a TDD cell.

Also, the following two methods may be considered as methods modified from the method 3-7.

(Method 3-7a) New FDD timing relations may be used for determining a relation between PDCCH/EPDCCH (or, PHICH) and PUSCH of the FDD cell, and a relation between PUSCH and PHICH of the FDD cell. For example, when a terminal receives an uplink grant (or, PHICH) at a n-th subframe of the TDD cell, the terminal may transmit a corresponding PUSCH at a (n+5)-th subframe of the FDD cell. Also, when a base station receives a PUSCH at a n-th subframe of the FDD cell, the base station may transmit a corresponding PHICH at a (n+5)-th subframe of the TDD cell.

(Method 3-7b) The new FDD timing relations may be used for determining a relation between PDCCH/EPDCCH (or, PHICH) and PUSCH of the FDD cell, and the conventional FDD timing relations may be used for determining a relation between PUSCH and PHICH of the FDD cell. For example, when a terminal receives an uplink grant (or, PHICH) at a n-th subframe of the TDD cell, the terminal may transmit a corresponding PUSCH at a (n+6)-th subframe of the FDD cell. Also, when a base station receives a PUSCH at a n-th subframe of the FDD cell, the base station may transmit a corresponding PHICH at a (n+4)-th subframe of the TDD cell.

According to the method 3-5, as many uplink subframes of the FDD cell as the number of uplink subframes of the TDD cell can be used. According to the method 3-7, as many uplink subframes of the FDD cell as the number of downlink subframes of the TDD cell can be used. Thus, in aspect of uplink resource efficiency of the FDD cell, the method 3-5 is better than the method 3-7 when the UL-DL configuration of the TDD cell is 0, and the method 3-7 is better than the method 3-5 when the UL-DL configuration of the TDD cell is one of 1 to 6. Accordingly, the following methods may be considered.

(Method 3-11) The method 3-5 may be applied to scheduling and HARQ-timing relations of the FDD cell when the UL-DL configuration of the TDD serving cell is 0. Also, the method 3-7 may be applied to scheduling and HARQ-timing relations of the FDD cell when the UL-DL configuration of the TDD serving cell is one of 1 to 6.

(Method 3-11a) The method 3-5 may be applied to scheduling and HARQ-timing relations of the FDD cell when the UL-DL configuration of the TDD serving cell is 0. Also, the method 3-7a may be applied to scheduling and HARQ-timing relations of the FDD cell when the UL-DL configuration of the TDD serving cell is one of 1 to 6.

(Method 3-11b) The method 3-5 may be applied to scheduling and HARQ-timing relations of the FDD cell when the UL-DL configuration of the TDD serving cell is 0. Also, the method 3-7b may be applied to scheduling and HARQ-timing relations of the FDD cell when the UL-DL configuration of the TDD serving cell is one of 1 to 6.

As described above, when the FDD service cell is cross-carrier-scheduled by the TDD cell, the cross-carrier scheduling is possible only in downlink frames of the TDD cell, and so uplink PUSCH scheduling of the FDD cell can be restricted.

When the FDD service cell is cross-carrier-scheduled by the TDD cell, in order to overcome the restriction on uplink PUSCH scheduling of the FDD cell, a multi-subframe scheduling can be introduced. That is, when the FDD serving cell is cross-carrier scheduled by the TDD cell, multiple subframes can be scheduled at once. In this case, one of the methods 3-5, 3-6, and 3-7 may be used to determine a temporal relation of UL-DL subframes of the FDD cell. If the multi-subframe scheduling is applied to the methods 3-5, 3-6, and 3-7, a temporal relation between a PUSCH allocated by the multi-subframe scheduling and a PHICH corresponding to the PUSCH should be newly defined.

(Method 3-12) When an uplink grant (or, PHICH) is transmitted at a n-th downlink subframe of the TDD cell, a corresponding PUSCH may be transmitted at a (n+k)-th uplink subframe of the FDD cell. Also, a PHICH transmitted at a i-th downlink subframe of the TDD cell may correspond to a PUSCH transmitted at a (i−m)-th uplink subframe of the FDD cell. Here, k for the UL-DL configurations 0 to 6 of the TDD serving cell may be defined as shown in a table 18, and m for the UL-DL configurations 0 to 6 of the TDD serving cell may be defined as shown in a table 19.

TABLE 18

| UL/DL configuration Of TDD serving cell | Subframe Number i | | | | | | | | | |
|---|---|---|---|---|---|---|---|---|---|---|
| | 0 | 1 | 2 | 3 | 4 | 5 | 6 | 7 | 8 | 9 |
| 0 | 4 | 4, 5, 6 | — | — | — | 4 | 4, 5, 6 | — | — | — |
| 1 | 4 | 4, 5, 6 | — | — | 4 | 4 | 4, 5, 6 | — | — | 4 |
| 2 | 4 | 4, 5 | — | 4 | 4 | 4 | 4, 5 | — | 4 | 4 |
| 3 | 4 | 4, 5, 6 | — | — | — | 4 | 4 | 4 | 4 | 4 |
| 4 | 4 | 4, 5, 6 | — | — | 4 | 4 | 4 | 4 | 4 | 4 |
| 5 | 4 | 4, 5 | — | 4 | 4 | 4 | 4 | 4 | 4 | 4 |
| 6 | 4 | 4, 5, 6 | — | — | — | 4 | 4, 5, 6 | — | — | 4 |

TABLE 19

| UL/DL configuration Of TDD serving cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 6 | 4, 5, 6 | — | — | — | 6 | 4, 5, 6 | — | — | — |
| 1 | 6 | 4, 5, 6 | — | — | 6 | 6 | 4, 5, 6 | — | — | 6 |
| 2 | 6 | 5, 6 | — | 6 | 6 | 6 | 5, 6 | — | 6 | 6 |
| 3 | 6 | 4, 5, 6 | — | — | — | 6 | 6 | 6 | 6 | 6 |
| 4 | 6 | 4, 5, 6 | — | — | 6 | 6 | 6 | 6 | 6 | 6 |
| 5 | 6 | 5, 6 | — | 6 | 6 | 6 | 6 | 6 | 6 | 6 |
| 6 | 6 | 4, 5, 6 | — | — | — | 6 | 4, 5, 6 | — | — | 6 |

The method 3-12 is a method which makes scheduling on uplink subframes of the FDD cell which did not have correspondence possible by additionally applying a multi-subframe scheduling to the time scheme based on the method 3-7. The subframes to which the multi-subframe scheduling is applied may be downlink subframes 1 and 6 of the TDD serving cell.

Figure 21:
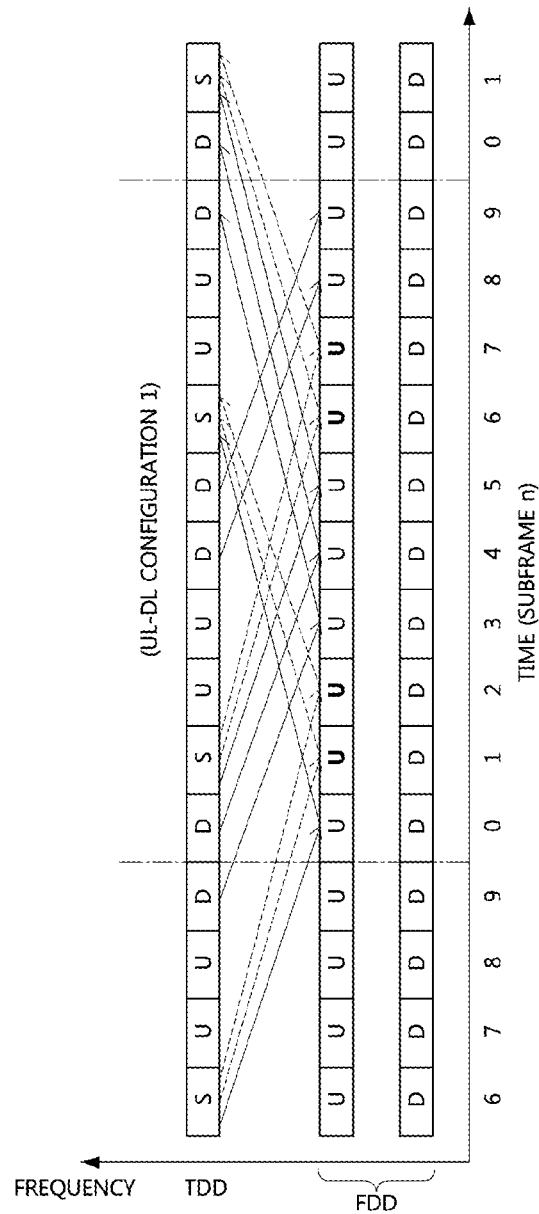
FIG. 21 is a conceptual diagram illustrating subframe relations of PDCCH/EPDCCH, PHICH, and PUSCH in a FDD cell (that is, a case when a UL-DL configuration of the TDD cell is 1 in the method 3-12) when the FDD cell is cross-carrier-scheduled by a TDD cell.

FIG. 21 is a conceptual diagram illustrating subframe relations of PDCCH/EPDCCH, PHICH, and PUSCH in a FDD cell (that is, a case when a UL-DL configuration of the TDD cell is 1 in the method 3-12) when the FDD cell is cross-carrier-scheduled by a TDD cell.

Referring to FIG. 21, uplink subframes of the FDD cell, to which new relations are added as compared to the method 3-7, may be 1, 2, 6, and 7. All HARQ RTT times of the HARQ processes which are mapped to them are 10 ms. It has a time length identical to the conventional HARQ RTT time length.

FIG. 22 is a conceptual diagram illustrating subframe relations of PDCCH/EPDCCH, PHICH, and PUSCH in a FDD cell (that is, a case when a UL-DL configuration of the TDD cell is 3 in the method 3-12) when the FDD cell is cross-carrier-scheduled by a TDD cell.

Referring to FIG. 22, illustrated are UL/DL subframe relations according to the method 3-12 when the UL-DL configuration of the TDD cell is 3. According to the method 3-11, an uplink subframe 8 of the FDD cell cannot be scheduled. In order to further use the uplink subframe 8 of the FDD cell, a complex timing relation should be newly introduced for the UL-DL configuration 3. In this case, a problem that HARQ RTT time becomes longer may occur. According to the method 3-12, HARQ processes corresponding to 9 uplink subframes except the uplink subframe 8 may have short RTT time of 10 ms. However, since a legacy terminal (for example, a terminal under release-11) or a terminal having a FDD primary cell still can be scheduled by using only restricted subframes, the above-described problem may not be a critical problem in aspect of overall system capacity.

If the method 3-12 is used, uplink subframes of the FDD cell whose use is restricted are subframes 3 and 8 when the UL-DL configuration is 0, subframe 8 when the UL-DL configuration is 3, and subframe 8 when the UL-DL configuration is 6.

According to the method 3-12, at most 3 PHICH corresponding to a PUSCH of the FDD cell may be concentrated to some downlink subframe of the TDD cell. For example, PHICHs corresponding to PUSCHs transmitted through uplink subframes 5, 6, and 7 of the FDD cell can be simultaneously transmitted through a downlink subframe 1 of the TDD cell. The following modified method can be used in order to distribute the load of PHICHs.

(Method 3-13) When an uplink grant (or, PHICH) is transmitted through a n-th downlink subframe of the TDD cell, a corresponding PUSCH can be transmitted through a (n+k')-th uplink subframe of the FDD cell. Also, a PHICH transmitted at a i-th downlink subframe of the TDD cell may correspond to a PUSCH transmitted at a (i−m')-th uplink subframe of the FDD cell. Here, k' for the UL-DL configurations 0 to 6 of the TDD serving cell may be defined as shown in a table 20, and m' for the UL-DL configurations 0 to 6 of the TDD serving cell may be defined as shown in a table 21.

TABLE 20

| UL/DL configuration Of TDD serving cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4, 5 | 5, 6 | — | — | — | 4, 5 | 5, 6 | — | — | — |
| 1 | 4, 5 | 5, 6 | — | — | 4 | 4, 5 | 5, 6 | — | — | 4 |
| 2 | 4 | 4, 5 | — | 4 | 4 | 4 | 4, 5 | — | 4 | 4 |
| 3 | 4, 5 | 5, 6 | — | — | — | 4 | 4 | 4 | 4 | 4 |
| 4 | 4, 5 | 5, 6 | — | — | 4 | 4 | 4 | 4 | 4 | 4 |

TABLE 20-continued

| UL/DL configuration Of TDD serving cell | Subframe Number n | | | | | | | | | |
|---|---|---|---|---|---|---|---|---|---|---|
| | 0 | 1 | 2 | 3 | 4 | 5 | 6 | 7 | 8 | 9 |
| 5 | 4 | 4, 5 | — | 4 | 4 | 4 | 4 | 4 | 4 | 4 |
| 6 | 4, 5 | 5, 6 | — | — | — | 4, 5 | 5, 6 | — | — | 4 |

TABLE 21

| UL/DL configuration Of TDD serving cell | Subframe Number i | | | | | | | | | |
|---|---|---|---|---|---|---|---|---|---|---|
| | 0 | 1 | 2 | 3 | 4 | 5 | 6 | 7 | 8 | 9 |
| 0 | 5, 6 | 4, 5 | — | — | — | 5, 6 | 4, 5 | — | — | — |
| 1 | 5, 6 | 4, 5 | — | — | 6 | 5, 6 | 4, 5 | — | — | 6 |
| 2 | 6 | 5, 6 | — | 6 | 6 | 6 | 5, 6 | — | 6 | 6 |
| 3 | 5, 6 | 4, 5 | — | — | — | 6 | 6 | 6 | 6 | 6 |
| 4 | 5, 6 | 4, 5 | — | — | 6 | 6 | 6 | 6 | 6 | 6 |
| 5 | 6 | 5, 6 | — | 6 | 6 | 6 | 6 | 6 | 6 | 6 |
| 6 | 5, 6 | 4, 5 | — | — | — | 5, 6 | 4, 5 | — | — | 6 |

While the example embodiments of the present invention and their advantages have been described in detail, it should be understood that various changes, substitutions and alterations may be made herein without departing from the scope of the invention.

The invention claimed is:

1. A communication method in a system in which a Frequency Division Duplexing (FDD) cell and a Time Division Duplexing (TDD) cell are aggregated, the method comprising:
   receiving a grant for uplink data channel transmission of the FDD cell through a (n−k−l)-th downlink subframe or special subframe of the TDD cell, wherein n is an integer number equal to or larger than 0 and k and l are natural numbers;
   transmitting an uplink data channel based on the grant for uplink data channel transmission through a (n−k)-th uplink subframe of the FDD cell; and
   receiving an ACK or NACK for the uplink data channel through a n-th subframe of the TDD cell,
   wherein n is a subframe index value indicating a position of a subframe in a frame of the TDD cell, and is one of 0 to 9,
   wherein l is 4 according to a timing scheme of the FDD cell, and k is 6 for uplink/downlink configurations of the TDD cell, in order to guarantee the n-th subframe indicated by n to be a downlink subframe or a special subframe of the TDD cell and to guarantee a same HARQ round-trip time, regardless of a uplink/downlink configuration of the TDD cell.

2. The communication method of claim 1, wherein the FDD cell is cross-carrier-scheduled by the TDD cell.

3. A communication method in a system in which a Frequency Division Duplexing (FDD) cell and a Time Division Duplexing (TDD) cell are aggregated, the method comprising:
   transmitting a grant for uplink data channel transmission of the FDD cell through a (n−k−l)-th downlink subframe or special subframe of the TDD cell, wherein n is an integer number equal to or larger than 0 and k and l are natural numbers;
   receiving an uplink data channel based on the grant for uplink data channel transmission through a (n−k)-th uplink subframe of the FDD cell; and
   transmitting an ACK or NACK for the uplink data channel through a n-th subframe of the TDD cell,
   wherein n is a subframe index value indicating a position of a subframe in a frame of the TDD cell, and is one of 0 to 9,
   wherein l is 4 according to a timing scheme of the FDD cell, and k is 6 for uplink/downlink configurations of the TDD cell, in order to guarantee the n-th subframe indicated by n to be a downlink subframe or a special subframe of the TDD cell and to guarantee a same HARQ round-trip time, regardless of a uplink/downlink configuration of the TDD cell.

4. A communication method in a system in which a Frequency Division Duplexing (FDD) cell and a Time Division Duplexing (TDD) cell are aggregated, the method comprising:
   receiving a NACK for an uplink data channel transmission of the FDD cell through a (n−k−l)-th downlink subframe or special subframe of the TDD cell, wherein n is an integer number equal to or larger than 0 and k and l are natural numbers;
   transmitting an uplink data channel based on the NACK through a (n−k)-th uplink subframe of the FDD cell; and
   receiving an ACK or NACK for the uplink data channel through a n-th subframe of the TDD cell,
   wherein n is a subframe index value indicating a position of a subframe in a frame of the TDD cell, and is one of 0 to 9,
   wherein l is 4 according to a timing scheme of the FDD cell, and k is 6 for uplink/downlink configurations of the TDD cell, in order to guarantee the n-th subframe indicated by n to be a downlink subframe or a special subframe of the TDD cell and to guarantee a same HARQ round-trip time, regardless of a uplink/downlink configuration of the TDD cell.

5. The communication method of claim 4, wherein the FDD cell is cross-carrier-scheduled by the TDD cell.

6. A communication method in a system in which a Frequency Division Duplexing (FDD) cell and a Time Division Duplexing (TDD) cell are aggregated, the method comprising:
   transmitting a NACK for an uplink data channel transmission of the FDD cell through a (n−k−l)-th downlink subframe or special subframe of the TDD cell, wherein n is an integer number equal to or larger than 0 and k and l are natural numbers;
   receiving an uplink data channel based on the NACK through a (n−k)-th uplink subframe of the FDD cell; and
   transmitting an ACK or NACK for the uplink data channel through a n-th subframe of the TDD cell,
   wherein n is a subframe index value indicating a position of a subframe in a frame of the TDD cell, and is one of 0 to 9,
   wherein l is 4 according to a timing scheme of the FDD cell, and k is 6 for uplink/downlink configurations of the TDD cell, in order to guarantee the n-th subframe indicated by n to be a downlink subframe or a special subframe of the TDD cell and to guarantee a same HARQ round-trip time, regardless of a uplink/downlink configuration of the TDD cell.

7. A communication method in a system in which a Frequency Division Duplexing (FDD) cell and a Time Division Duplexing (TDD) cell are aggregated, the method comprising:
  receiving a grant for uplink data channel transmission of the TDD cell through a n-th downlink subframe of the FDD cell, wherein n is an integer number equal to or larger than 0;
  transmitting an uplink data channel based on the grant for uplink data channel transmission through a (n+k)-th uplink subframe of the TDD cell, wherein k is a natural number; and
  receiving an ACK or NACK for the uplink data channel through a (n+k+l)-th downlink subframe of the FDD cell, wherein l is a natural number,
  wherein n is a subframe index value indicating a position of a subframe in a frame of the TDD cell, and is one of 0 to 9,
  wherein k is determined according to a subframe index value of the n-th subframe and an uplink-downlink configuration of the TDD cell based on a following table

| UL-DL configuration | Subframe index value of the n-th subframe | | | | | | | | | |
|---|---|---|---|---|---|---|---|---|---|---|
| | 0 | 1 | 2 | 3 | 4 | 5 | 6 | 7 | 8 | 9 |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5. |

8. The communication method of claim 7, wherein the TDD cell is cross-carrier-scheduled by the FDD cell.

9. The communication method of claim 7, wherein l is determined according to a subframe index value of the (n+k)-th subframe and an uplink-downlink configuration of the TDD cell based on a following table

| UL-DL configuration | Subframe index value of the (n + k)-th subframe | | | | | | | | | |
|---|---|---|---|---|---|---|---|---|---|---|
| | 0 | 1 | 2 | 3 | 4 | 5 | 6 | 7 | 8 | 9 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7. | |

10. A communication method in a system in which a Frequency Division Duplexing (FDD) cell and a Time Division Duplexing (TDD) cell are aggregated, the method comprising:
  transmitting a grant for uplink data channel transmission of the TDD cell through a n-th downlink subframe of the FDD cell, wherein n is an integer number equal to or larger than 0;
  receiving an uplink data channel based on the grant for uplink data channel transmission through a (n+k)-th uplink subframe of the TDD cell, wherein k is a natural number; and
  transmitting an ACK or NACK for the uplink data channel through a (n+k+l)-th downlink subframe of the FDD cell, wherein l is a natural number,
  wherein n is a subframe index value indicating a position of a subframe in a frame of the TDD cell, and is one of 0 to 9,
  wherein k is determined according to a subframe index value of the n-th subframe and an uplink-downlink configuration of the TDD cell based on a following table

| UL-DL configuration | Subframe index value of the n-th subframe | | | | | | | | | |
|---|---|---|---|---|---|---|---|---|---|---|
| | 0 | 1 | 2 | 3 | 4 | 5 | 6 | 7 | 8 | 9 |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5. |

* * * * *